US011432529B2

(12) United States Patent
Flannery et al.

(10) Patent No.: US 11,432,529 B2
(45) Date of Patent: Sep. 6, 2022

(54) BREAKABLE DOWN FOLDING PET CRATE

(71) Applicant: Carlson Pet Products, Inc., Longboat Key, FL (US)

(72) Inventors: Mark A. Flannery, Longboat Key, FL (US); Lyle H. Rogalla, Hugo, MN (US); Danial E. Julian, Athens, IL (US)

(73) Assignee: Carlson Pet Products, Inc., Longboat Key, FL (US)

( * ) Notice: Subject to any disclaimer, the term of this patent is extended or adjusted under 35 U.S.C. 154(b) by 218 days.

(21) Appl. No.: 16/939,049

(22) Filed: Jul. 26, 2020

(65) Prior Publication Data

US 2020/0352131 A1 Nov. 12, 2020

Related U.S. Application Data

(63) Continuation of application No. 16/266,110, filed on Feb. 3, 2019, now Pat. No. 10,721,910, which is a
(Continued)

(51) Int. Cl.
*A01K 1/03* (2006.01)
*A01K 31/08* (2006.01)
(Continued)

(52) U.S. Cl.
CPC ............ *A01K 1/033* (2013.01); *A01K 1/0245* (2013.01); *A01K 1/034* (2013.01); *A01K 1/0125* (2013.01)

(58) Field of Classification Search
CPC ...... A01K 1/0245; A01K 31/08; A01K 1/033; A01K 1/03; A01K 1/034; A01K 1/0125;
(Continued)

(56) References Cited

U.S. PATENT DOCUMENTS 2,079,458 A * 5/1937 Leichtfuss ............... B65D 7/26
119/497
4,484,540 A * 11/1984 Yamamoto ........... A01K 1/0245
119/497
(Continued)

FOREIGN PATENT DOCUMENTS

GB 2035034 A * 6/1980 ........... A01K 1/0245
JP 3075143 U 11/2000
JP 2003-289737 A 10/2003

OTHER PUBLICATIONS

PCT ISA, Notification of Transmittal of the International Search Report and the Written Opinion of the International Searching Authority, or the Declaration, dated May 4, 2010.
(Continued)

*Primary Examiner* — Yvonne R Abbott-Lewis

(57) ABSTRACT

A pet crate having a top, a bottom, and a cage between the top and bottom. The cage can be engaged to and disengaged from each of the top and bottom. When engaged to the top and bottom, or when disengaged from either one or both of the top and bottom, the cage is endless and can safely hold a pet therein. When disengaged from the top and bottom, the cage is foldable into a closed, endless and flat configuration such that the cage can be stored between the top and bottom such that the crate as a whole in such stored configuration is generally flat. When disengaged from the top and bottom, the cage is foldable out into a fence configuration by disconnecting two ends of the cage.

12 Claims, 16 Drawing Sheets

Related U.S. Application Data continuation of application No. 14/839,976, filed on Aug. 29, 2015, now Pat. No. 10,194,636, which is a continuation of application No. 13/621,738, filed on Sep. 17, 2012, now Pat. No. 9,119,375, which is a continuation of application No. 12/562,090, filed on Sep. 17, 2009, now Pat. No. 8,267,048.

(60) Provisional application No. 61/215,724, filed on May 8, 2009, provisional application No. 61/192,639, filed on Sep. 19, 2008.

(51) Int. Cl.
*A01K 1/02* (2006.01)
*A01K 1/01* (2006.01)

(58) Field of Classification Search
CPC .... A01K 1/0254; A01K 31/002; A01K 1/035; A01K 1/08; A01K 31/06
USPC ....... 119/499, 498, 474, 497, 168, 496, 453, 119/461, 481, 484, 491; 220/4.28, 6; 206/600
See application file for complete search history.

(56) References Cited

U.S. PATENT DOCUMENTS

| | | | | |
|---|---|---|---|---|
| 4,590,885 A | * | 5/1986 | Sugiura | A01K 31/08 119/497 |
| 4,606,461 A | * | 8/1986 | Bolton, Sr. | B65D 19/20 229/117.02 |
| 4,630,745 A | * | 12/1986 | Shiotani | B65D 11/182 217/15 |
| 4,762,085 A | * | 8/1988 | Ondrasik | A01K 31/08 119/474 |
| 4,763,606 A | * | 8/1988 | Ondrasik, II | A01K 1/0245 119/474 |
| 4,807,808 A | * | 2/1989 | Reed | A01K 1/033 229/117.02 |
| 4,909,188 A | * | 3/1990 | Tominaga | A01K 31/06 119/474 |
| 4,986,217 A | * | 1/1991 | Robinson | A01K 1/0125 229/117.02 |
| 5,076,457 A | | 12/1991 | Marovskis | |
| 5,167,205 A | * | 12/1992 | Bell | A01K 1/0125 229/122.34 |
| 5,178,100 A | * | 1/1993 | Monk | A01K 1/0125 229/117.02 |
| 5,452,681 A | * | 9/1995 | Ho | A01K 31/08 119/491 |
| 5,669,331 A | * | 9/1997 | Richmond | A01K 1/0245 119/497 |
| 6,108,982 A | * | 8/2000 | Davison | A63H 3/52 446/478 |
| 6,131,534 A | * | 10/2000 | Axelrod | A01K 1/0245 119/497 |
| 6,345,591 B1 | * | 2/2002 | Richmond | A01K 1/0245 119/497 |
| 6,408,797 B2 | * | 6/2002 | Pivonka | A01K 1/0245 119/498 |
| 6,539,895 B2 | * | 4/2003 | Hoagland | A01K 1/0245 119/453 |
| 6,722,315 B2 | * | 4/2004 | Sinor | A01K 1/035 220/478 |
| 6,883,463 B2 | | 4/2005 | Link | |
| 6,997,138 B1 | * | 2/2006 | Simpson | A01K 1/033 217/122 |
| 7,455,032 B2 | * | 11/2008 | Axelrod | A01K 1/0245 119/499 |
| 7,721,678 B2 | * | 5/2010 | Jakubowski | A01K 31/08 119/474 |
| 2005/0034679 A1 | * | 2/2005 | Link | A01K 31/08 119/474 |
| 2005/0145192 A1 | * | 7/2005 | Axelrod | A01K 1/0245 119/499 |
| 2005/0229866 A1 | * | 10/2005 | Simpson | A01K 1/033 119/499 |
| 2006/0005780 A1 | * | 1/2006 | Willinger | A01K 31/06 119/461 |
| 2006/0037554 A1 | * | 2/2006 | Axelrod | A01K 31/08 119/499 |
| 2006/0102092 A1 | * | 5/2006 | Cortez | A01K 1/0125 119/498 |
| 2006/0174841 A1 | * | 8/2006 | Axelrod | A01K 1/0245 119/498 |
| 2008/0245313 A1 | | 10/2008 | Jakubowski et al. | |
| 2011/0203528 A1 | * | 8/2011 | Northrop | A01K 1/033 119/497 |

OTHER PUBLICATIONS

PCT International Searching Authority, International Search Report, dated May 4, 2010.
PCT International Searching Authority, Written Opinion of the International Searching Authority, dated May 4, 2010.

* cited by examiner

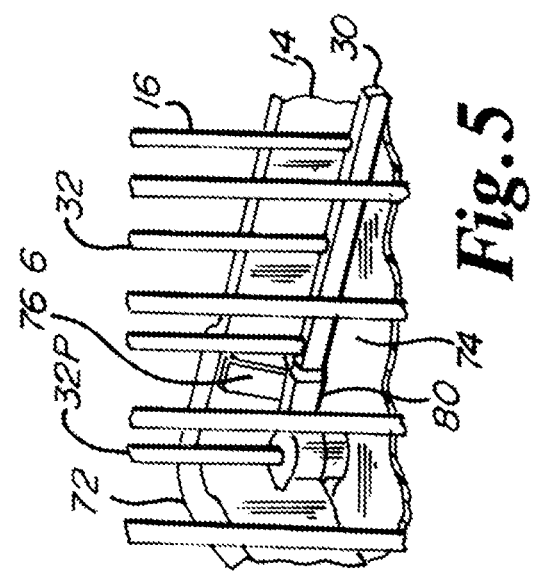

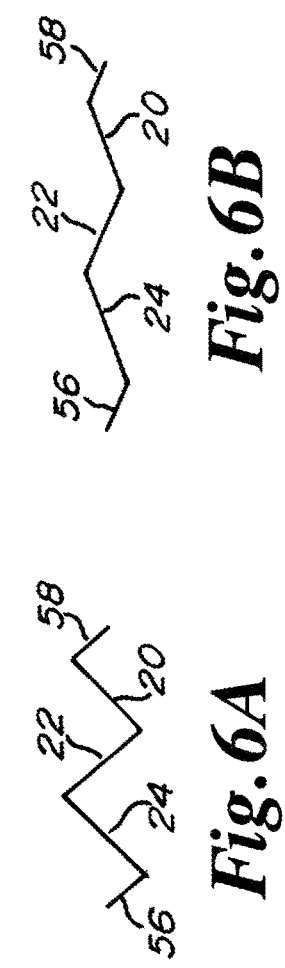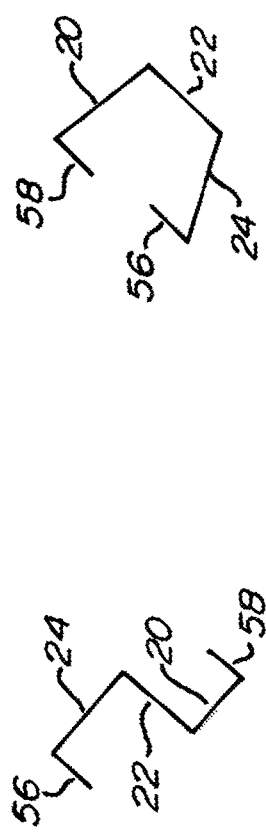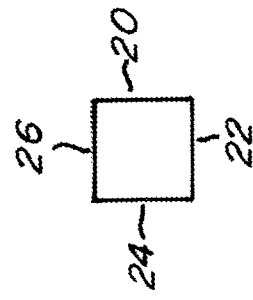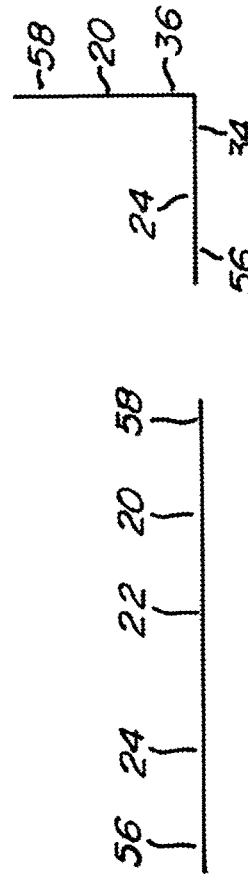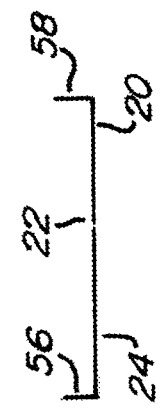

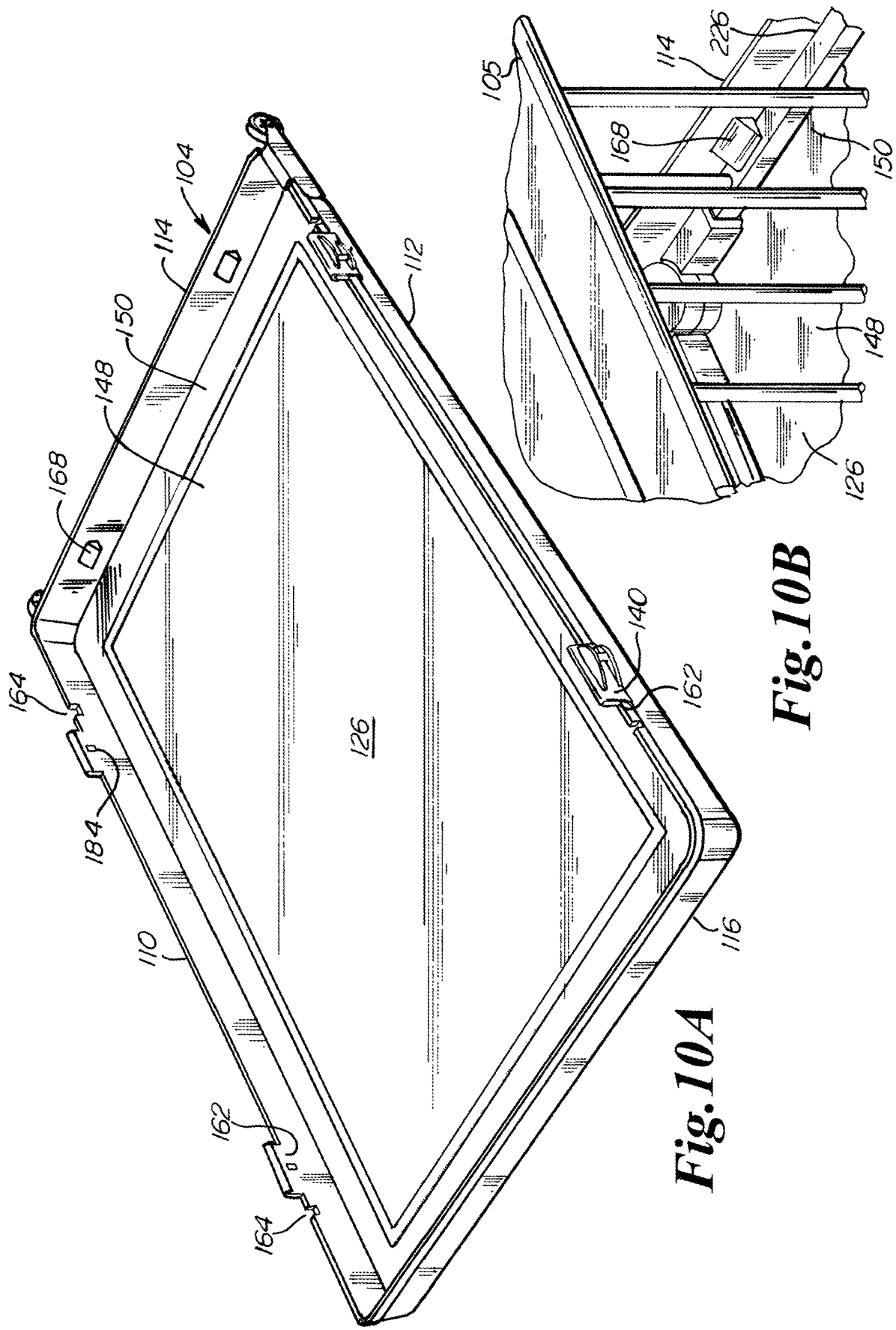

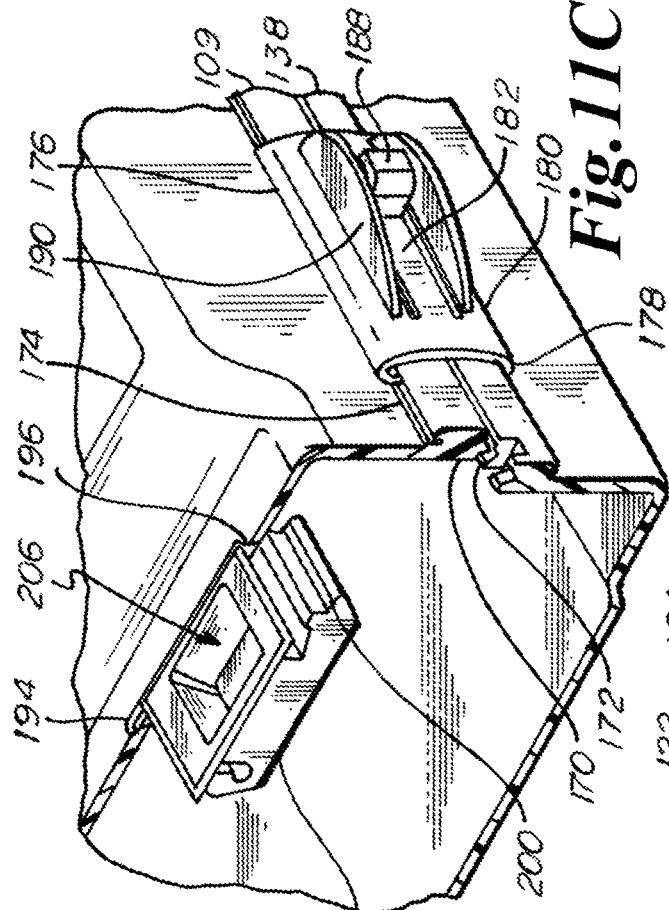
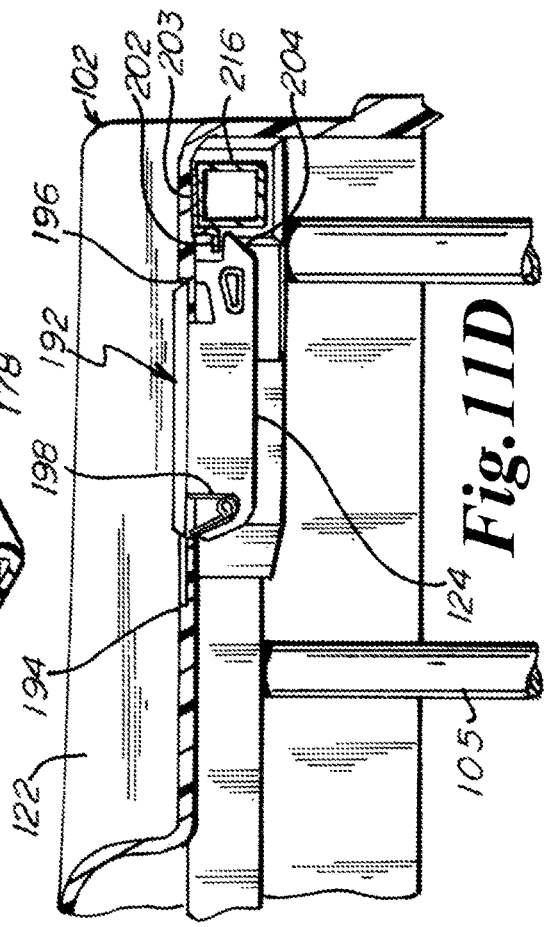
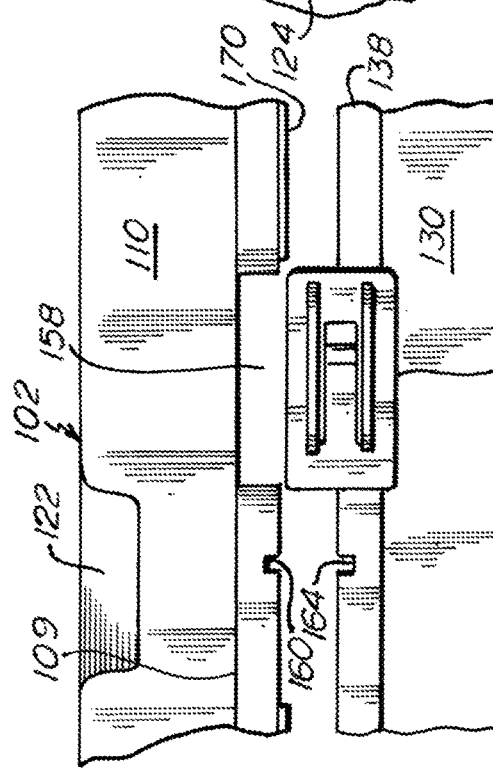
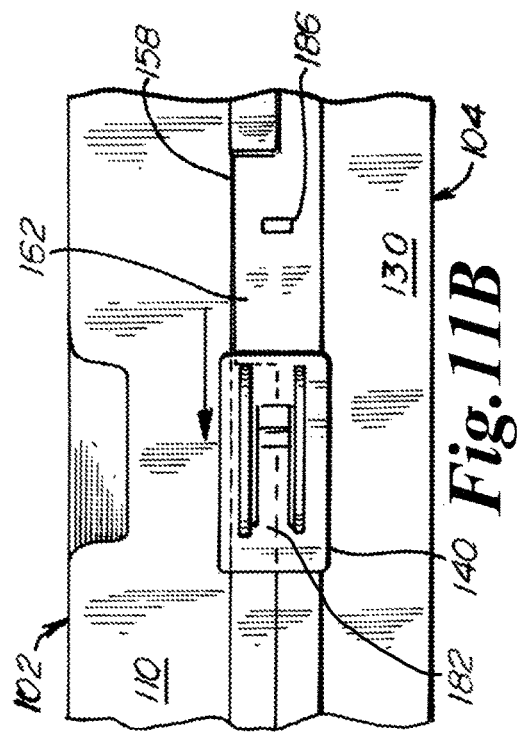

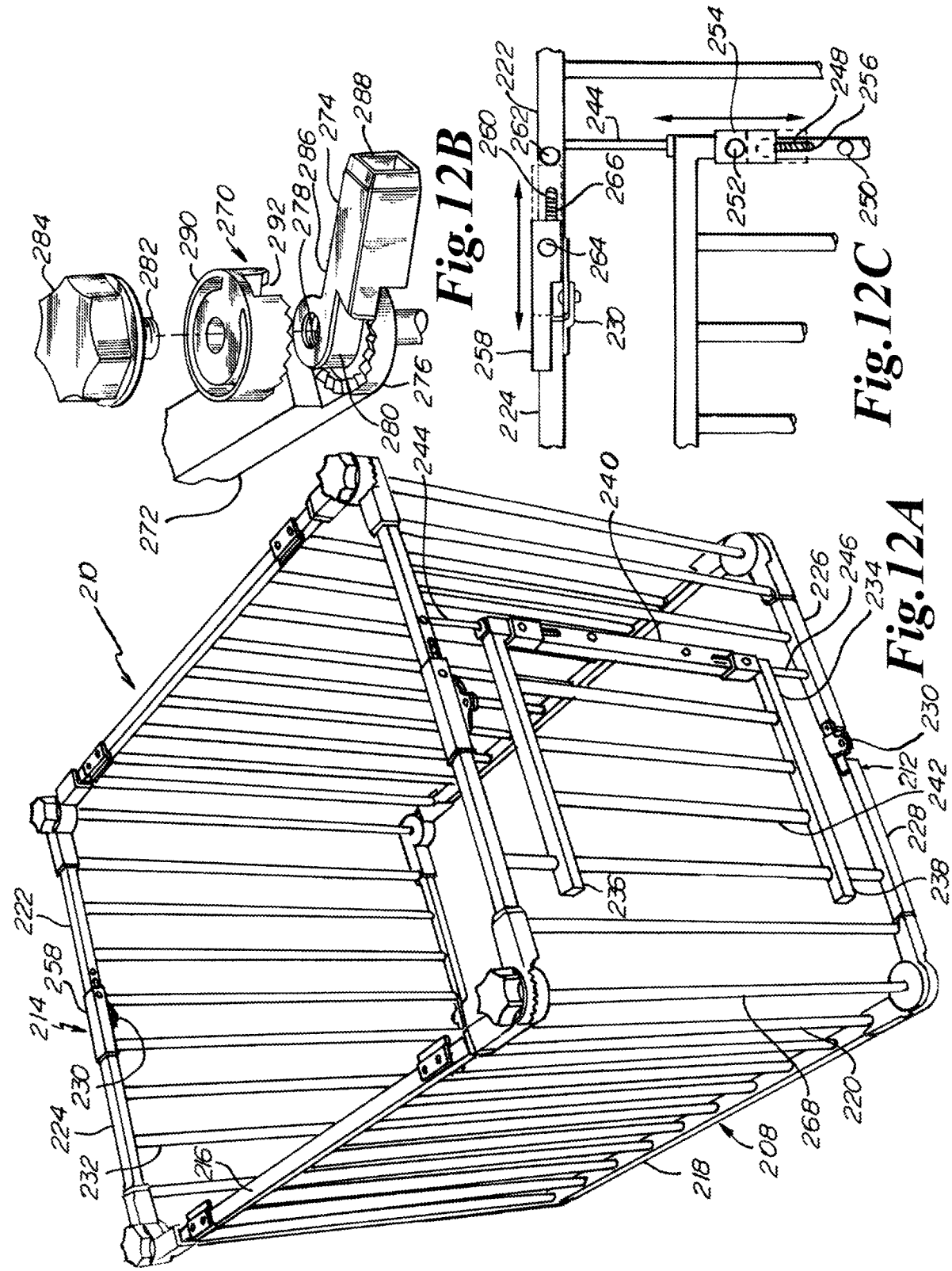

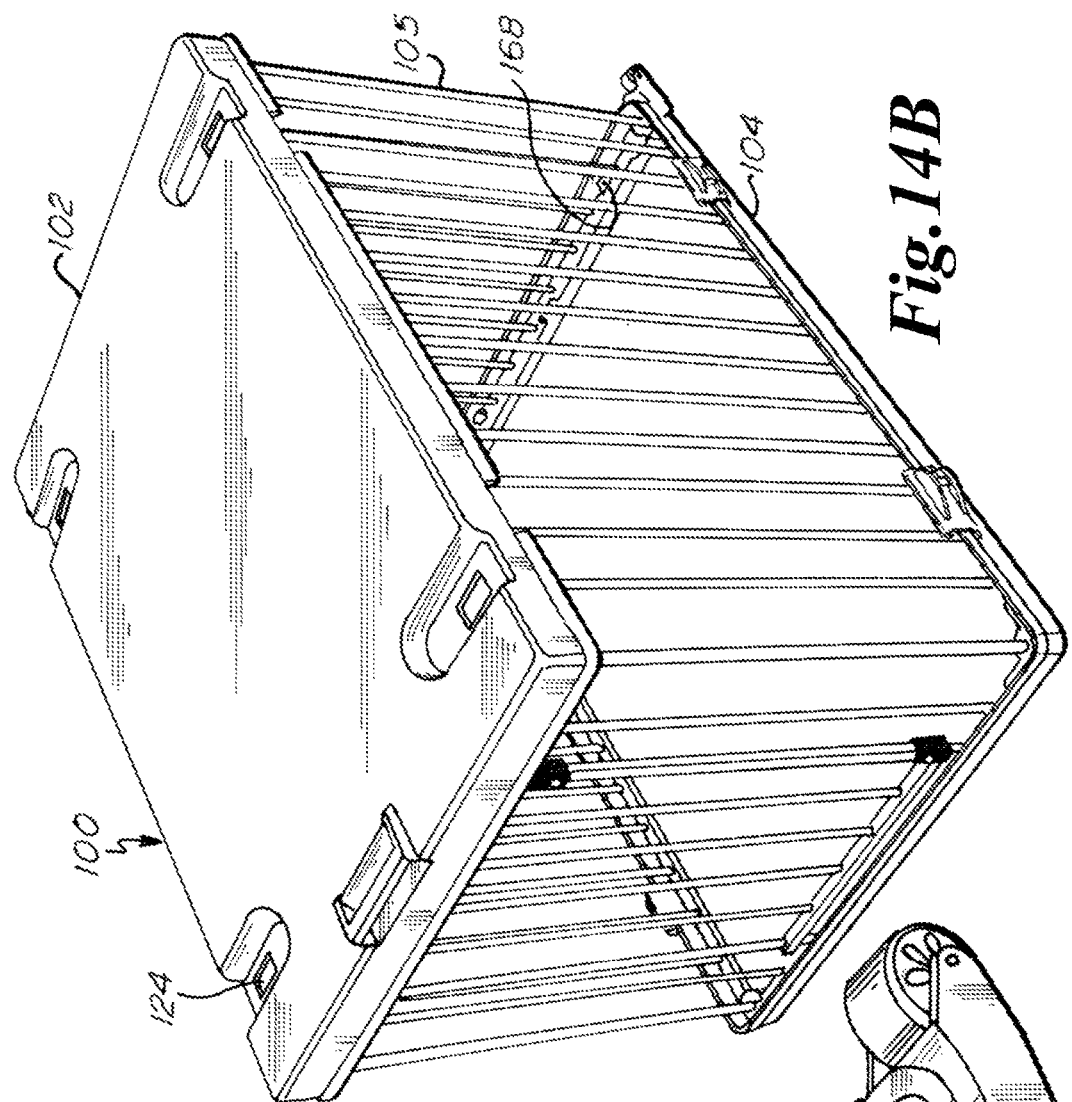
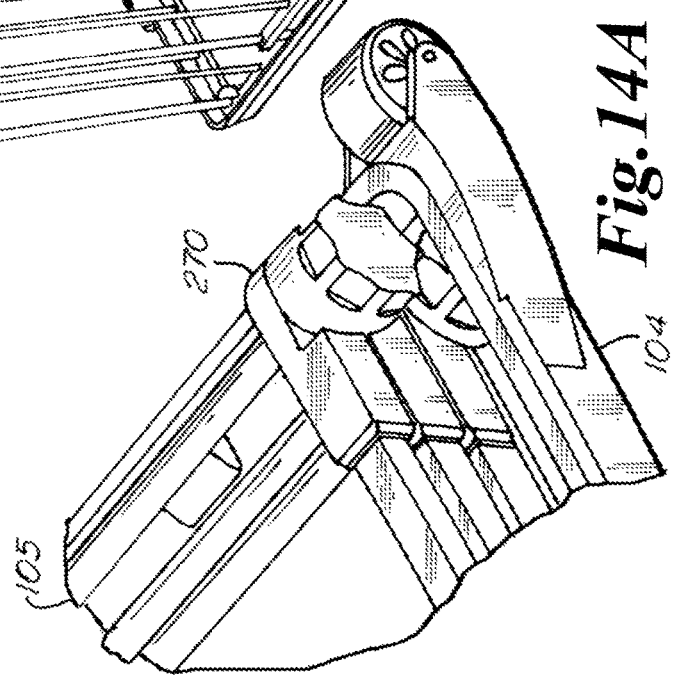
Fig.14B
Fig.14A

BREAKABLE DOWN FOLDING PET CRATE

This application is a continuation of U.S. patent application Ser. No. 16/266,110 filed Feb. 3, 2019 (U.S. Pat. No. 10,721,910 issued Jul. 28, 2020) and claims the benefit thereof under 35 U.S.C. § 120, which application is a continuation of U.S. patent application Ser. No. 14/839,976 filed Aug. 29, 2015 (U.S. Pat. No. 10,194,636 issued Feb. 5, 2019) and claims the benefit thereof under 35 U.S.C. § 120, which application is a continuation of U.S. patent application Ser. No. 13/621,738 filed Sep. 17, 2012 (U.S. Pat. No. 9,119,375 issued Sep. 1, 2015) and claims the benefit thereof under 35 U.S.C. § 120, which application is a continuation of U.S. patent application Ser. No. 12/562,090 filed Sep. 17, 2009 (U.S. Pat. No. 8,267,048 issued Sep. 18, 2012) that claims the benefit thereof under 35 U.S.C. § 120, all of which applications claim the benefit under 35 U.S.C. 119(e) of U.S. Provisional Patent Application No. 61/215,724 filed May 8, 2009 and U.S. Provisional Patent Application No. 61/192,639 filed Sep. 19, 2008, all of which nonprovisional and provisional applications are hereby incorporated by reference in their entireties into this application.

FIELD OF THE INVENTION

The present invention generally relates to a pet carrier and specifically to a pet carrier that can be knocked down quickly for storage, can be quickly set up, is in the form of a crate, and includes a top, a bottom and a foldable cage therebetween.

BACKGROUND OF THE INVENTION

A pet carrier can be a relatively small hand held fishing tackle like box for a cat. A pet carrier can be a relatively large crate like holder for a dog.

Access to the inside of the pet carrier may be via a wire gate on the front, side or top of the carrier. If the pet carrier is designed for a dog, the wire gate may be removable such that the dog can come and go as he or she pleases.

Pet carriers can be designed simply as a cage, with all six sides of the carrier being wire or wire like, where the six sides are the front, rear, right side, left side, top, and bottom of the parallelepiped pet carrier. Large carriers, such as those designed for dogs, may be formed of plastic and include opaque walls with relatively few windows so as to provide a secure cave like home for a dog.

Pet carriers may be designed for use in vehicles, such as for placement in the rear of a sport utility vehicle or in the rear of a station wagon. A pet carrier may double as a temporary or portable dog house.

SUMMARY OF THE INVENTION

A feature of the present invention is the provision in a breakable down folding pet crate, of the pet crate having a top, a bottom, and a cage between the top and bottom, wherein the cage is engagable to and disengagable from each of the top and bottom.

Another feature of the present invention is the provision in a breakable down folding pet crate, of the pet crate having a top, a bottom, and a cage between the top and bottom, wherein the cage includes a folded out configuration where opposing sides of the cage are spaced apart, and wherein the cage includes a folded down configuration where opposing sides of the cage confront each other.

Another feature of the present invention is the provision in a breakable down folding pet crate, of the pet crate having a top, a bottom, and a cage between the top and bottom, wherein the cage when disengaged from the top and bottom is foldable.

Another feature of the present invention is the provision in a breakable down folding pet crate, of the pet crate having a top, a bottom, and a cage between the top and bottom, wherein the cage includes sides, with each of the sides being swingable relative to an adjacent side such that the cage is foldable.

Another feature of the present invention is the provision in a breakable down folding pet crate, of the pet crate having a top, a bottom, and a cage between the top and bottom, wherein the cage is removably force fit or snap fit into each of the top and bottom.

Another feature of the present invention is the provision in a breakable down folding pet crate, of the pet crate having a top, a bottom, and a cage between the top and bottom, wherein the cage includes a closed relatively flat configuration having six sides, and wherein adjacent sides are disposed at acute angles to each other.

Another feature of the present invention is the provision in a breakable down folding pet crate, of the pet crate having a top, a bottom, and a cage between the top and bottom, wherein the cage includes a folded out configuration and a folded down configuration, and wherein each of the open and folded down configurations are endless.

Another feature of the present invention is the provision in a breakable down folding pet crate, of the pet crate having a top, a bottom, and a cage between the top and bottom, wherein the cage includes an intermediate configuration between an open and folded down configuration, wherein each of the open, intermediate and folded down configurations are endless, and wherein the intermediate configuration has generally a dovetail shape when viewed from above.

Another feature of the present invention is the provision in a breakable down folding pet crate, of the pet crate having a top, a bottom, and a cage between the top and bottom, wherein the cage includes folding sides and nonfolding sides.

Another feature of the present invention is the provision in a breakable down folding pet crate, of the pet crate having a top, a bottom, and a cage between the top and bottom, wherein the cage includes a side having interior side portions that are swingable relative to each other.

Another feature of the present invention is the provision in a breakable down folding pet crate, of the pet crate having a top, a bottom, and a cage between the top and bottom, wherein the cage includes a side having interior side portions that lie in a common plane when the cage is in a folded out configuration, and wherein the interior side portions confront each other when the cage is in a folded down configuration.

Another feature of the present invention is the provision in a breakable down folding pet crate, of the pet crate having a top, a bottom, and a cage between the top and bottom, wherein the cage includes a broken down endless generally flat configuration for storage where opposing sides of the cage confront each other, wherein the cage includes an intermediate configuration and takes a dovetail shape, wherein the cage includes an open endless configuration where the ends are engaged to each other, and wherein the cage includes a stand alone fence configuration where the two ends are disengaged from each other.

Another feature of the present invention is the provision in a breakable down folding pet crate, of the pet crate having a top, a bottom, and a cage between the top and bottom, wherein the cage includes a side with interior side portions and a gate, and wherein the gate extends into each of the interior side portions when the cage is in the open position and the gate and interior side portions are in a common plane.

Another feature of the present invention is the provision in a breakable down folding pet crate, of the pet crate having a top, a bottom, and a cage between the top and bottom, wherein the top includes a receptacle, wherein the bottom includes a receptacle, and wherein the cage when in the folded down configuration is set in at least one of the receptacles and where the top is engaged to the bottom.

An advantage of the present invention is a pet crate that can take a number of forms for a number of purposes. For example, the present invention can take any one of the following forms:

an outside or inside dog house with a floor and a roof;
an outside dog house with a grass floor and a roof;
a play yard without a floor and without a roof;
a play yard with a floor and without a roof;
a carrier with a floor and a roof that is placed in the back of a sport utility vehicle;
a carrier with a floor and without a roof that is placed in the back of a station wagon;
a partition for the back of a station wagon to prevent a pet from jumping up to the back seat and beyond up to the front seat;
a partition to separate the kitchen from the living room; and
a partition to hold the pet in a certain area, such as a corner, of a living room.

Another advantage is that the present invention in the folded down configuration is compact. The folded down configuration is relatively flat and takes up a minimum of space.

Another advantage is that the present invention requires a minimal amount of work to break down the present crate from the folded out configuration to the folded down configuration. One feature contributing to this advantage is that the top and bottom are force fit or snap fit onto the cage. Another feature contributing to this advantage is that the cage is endless in each of the open and folded down configurations. That is, after the top and bottom have been snapped off the cage, the cage swings or folds to the folded down configuration. There are a minimum numbers of parts to unhook or disconnect to fold the cage.

Another advantage of the present invention is that it is simple to set up, simple to use, and simple to break down.

Another advantage of the present invention is that it is simple and inexpensive to manufacture and therefore relatively inexpensive to the consumer.

Another advantage of the present invention is that it is a space saver. When the cage is folded and packed away between the crate top and crate bottom, the folded up and packed away pet crate takes up about 25% of the space that is taken up by the folded out and operating cage engaged between the crate top and the crate bottom.

Another advantage of the present invention is that the crate top and crate bottom serve a dual purpose. On the one hand, the crate top and crate bottom function as a storage case. On the other hand, the crate top and crate bottom serve as a floor and roof for the cage.

BRIEF DESCRIPTION OF THE DRAWINGS

FIG. 5 is a detail perspective view of a portion of the cage and a portion of the bottom, and shows how the cage snaps to the bottom, which snap fit is the same for the top.

FIG. 6A is a schematic top view of the cage of the pet crate of FIG. 1, showing the cage in a stand alone fence configuration, where the fence takes a zig-zag shape and adjacent cage sides are disposed generally at right angles to each other.

FIG. 6B is a schematic top view of the cage of the pet crate of FIG. 1, showing the cage in a stand alone fence configuration, where the fence takes a zig-zag shape and adjacent cage sides are disposed generally at obtuse angles to each other.

FIG. 6C is a schematic top view of the cage of the pet crate of FIG. 1, showing the cage in a stand alone fence configuration, where the fence takes a zig-zag shape and adjacent cage sides are disposed generally at acute angles to each other.

FIG. 6D is a schematic top view of the cage of the pet crate of FIG. 1, showing the cage in a stand alone fence configuration, where the fence takes an S-shape configuration and adjacent cage sides are disposed at generally right angles to each other.

FIG. 6E is a schematic top view of the cage of the pet crate of FIG. 1, showing the cage in a stand alone fence configuration, where the ends of the cage are disengaged but confronting each other.

FIG. 6F is a schematic top view of the cage of the pet crate of FIG. 1, showing the cage in a stand alone play yard configuration, where the ends of the cage are engaged to each other.

FIG. 6G is a schematic top view of the cage of the pet crate of FIG. 1, showing the cage in a stand alone fence configuration, where the cage sides are disposed in a common plane and where feet of the cage may be pushed into soft grass and soil to maintain the fence configuration upright.

FIG. 6H is a schematic top view of the cage of the pet crate of FIG. 1, showing the cage in a stand alone fence configuration, where three cage sides are in a first plane, where three other cage sides are in a second plane, and where the first and second planes are at a right angle to each other.

FIG. 6I is a schematic top view of the cage of the pet crate of FIG. 1, showing the cage in a stand alone fence configuration, where the cage sides and cage interior side portions form a C-type configuration.

FIG. 10A is a perspective view of the bottom of the pet crate of FIG. 7.

FIG. 10B is a perspective, detail view of a portion of the cage and a portion of the crate bottom and shows a horizontal member of the cage engaged under a boss of the crate bottom.

FIG. 11A is a side, detail view of a portion of the crate top and a portion of the crate bottom, shows the crate top coming into engagement with the crate bottom, and further shows a slide in the unlocked position.

FIG. 11B is a side, detail view of a portion of the crate top and a portion of the crate bottom, shows the crate top engaged with the crate bottom, and shows the slide of FIG. 11B in the locked position.

FIG. 11C is a perspective, detail, partially section view of a portion of the crate top and a portion of the crate bottom, shows the crate top engaged with the crate bottom, shows the slide in the locked position, and further shows a cage snap.

FIG. 11D is an end, detail, partially section view of a portion of the crate top and a portion of the cage, and shows the snap locked under a protuberance of the cage to lock the crate top to the cage.

FIG. 12A is a perspective view of the cage of the pet crate of FIG. 7 in the folded out configuration.

FIG. 12B is a perspective, detail view of a portion of the corner post locking and unlocking mechanism of the cage of FIG. 12A.

FIG. 12C is a side, detail view of a portion of the cage, showing a portion of a gate in the cage, and further showing a slide for locking one side portion of the cage from swinging relative to another side portion of the cage.

FIG. 14A is a perspective, detail view of a corner portion of the pet crate of FIG. 7 and shows the cage in the crate bottom in the folded down configuration.

FIG. 14B is a perspective view of the pet crate of FIG. 7 where the cage is in the folded out configuration and engaged to each of the crate top and crate bottom.

DETAILED DESCRIPTION

Figure 1:
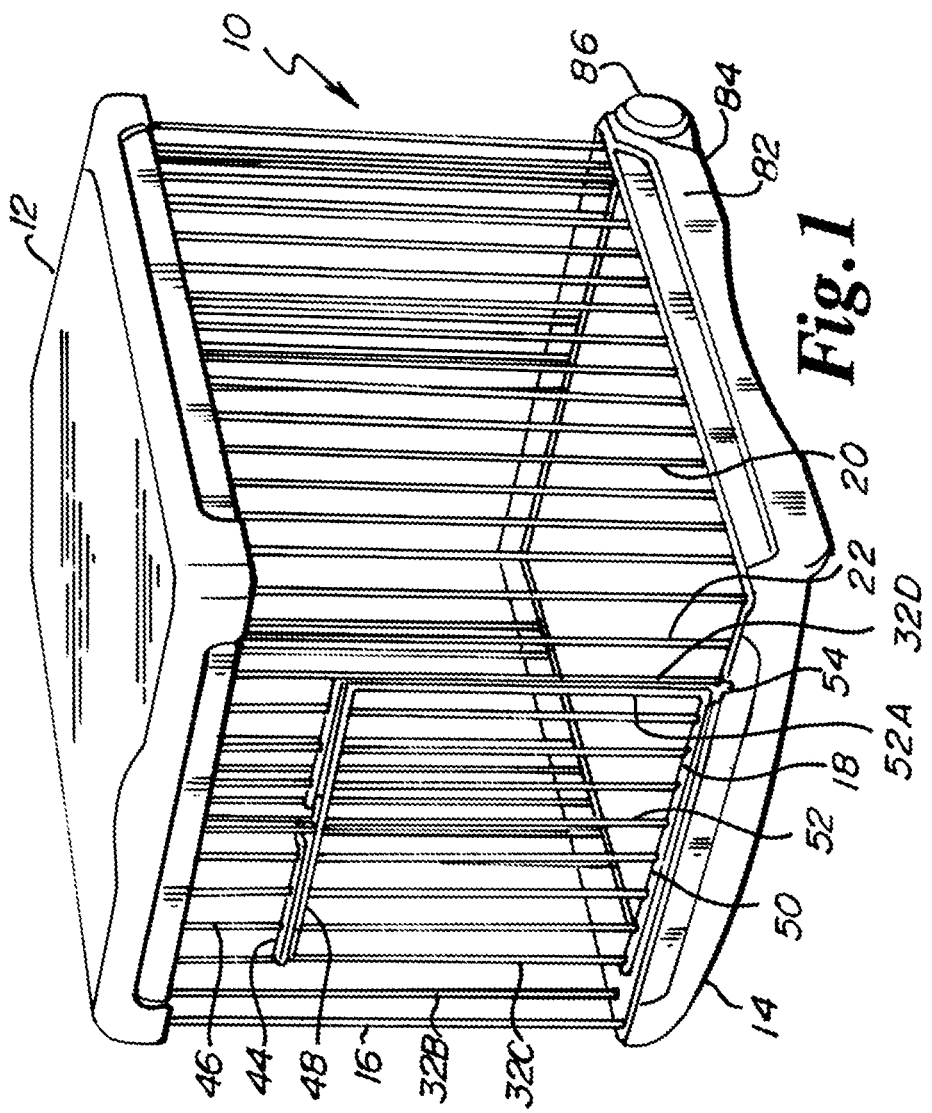
FIG. 1 is a perspective view of the present breakable down folding pet crate showing the cage in a folded out configuration snapped to the top and bottom of the pet crate.
Figure 2:
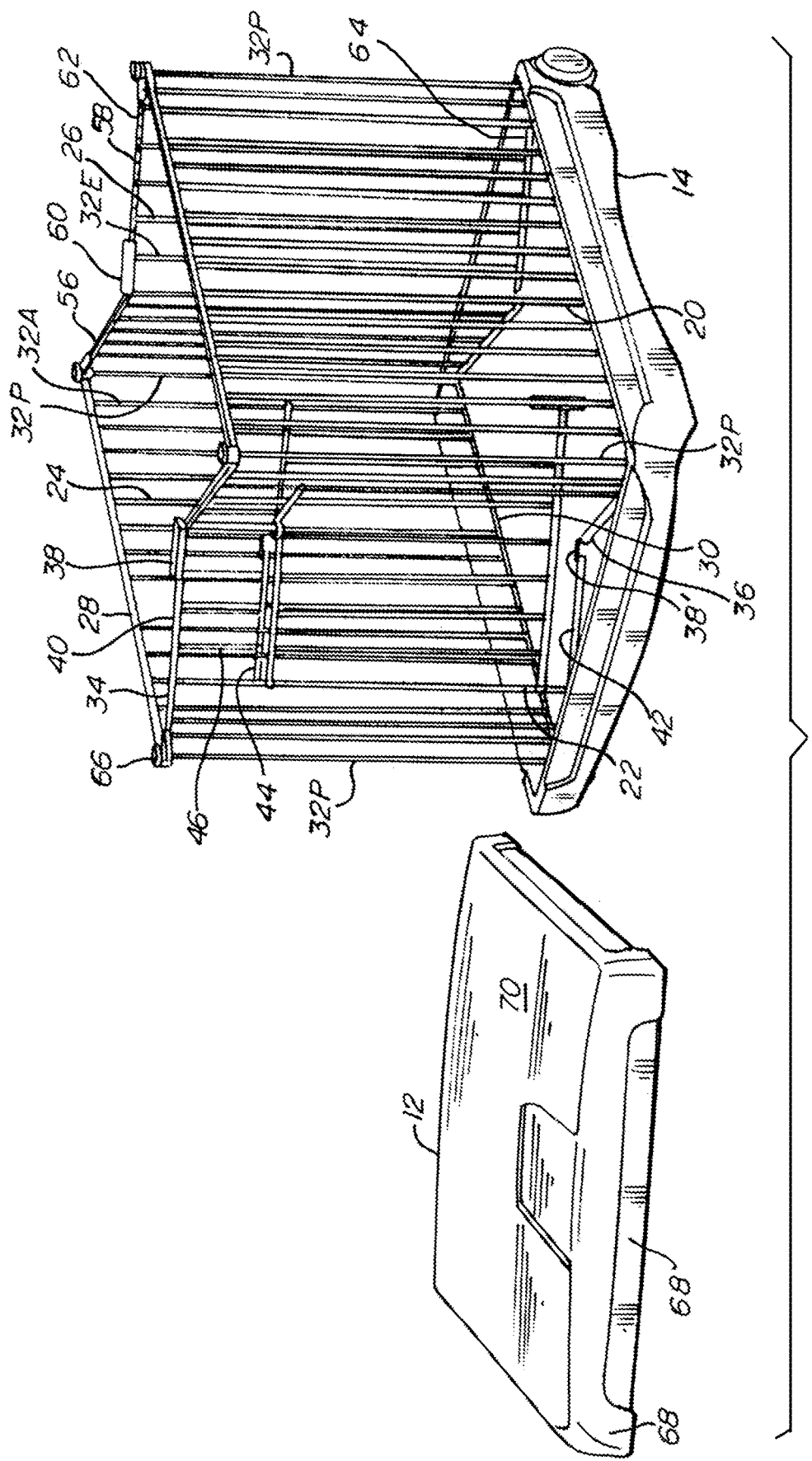
FIG. 2 is a perspective view of the pet crate of FIG. 1 showing the cage in an intermediate configuration with the top snapped off the cage, with the cage in the bottom, with the cage snapped free of the bottom, and with the cage beginning to fold.
Figure 3:
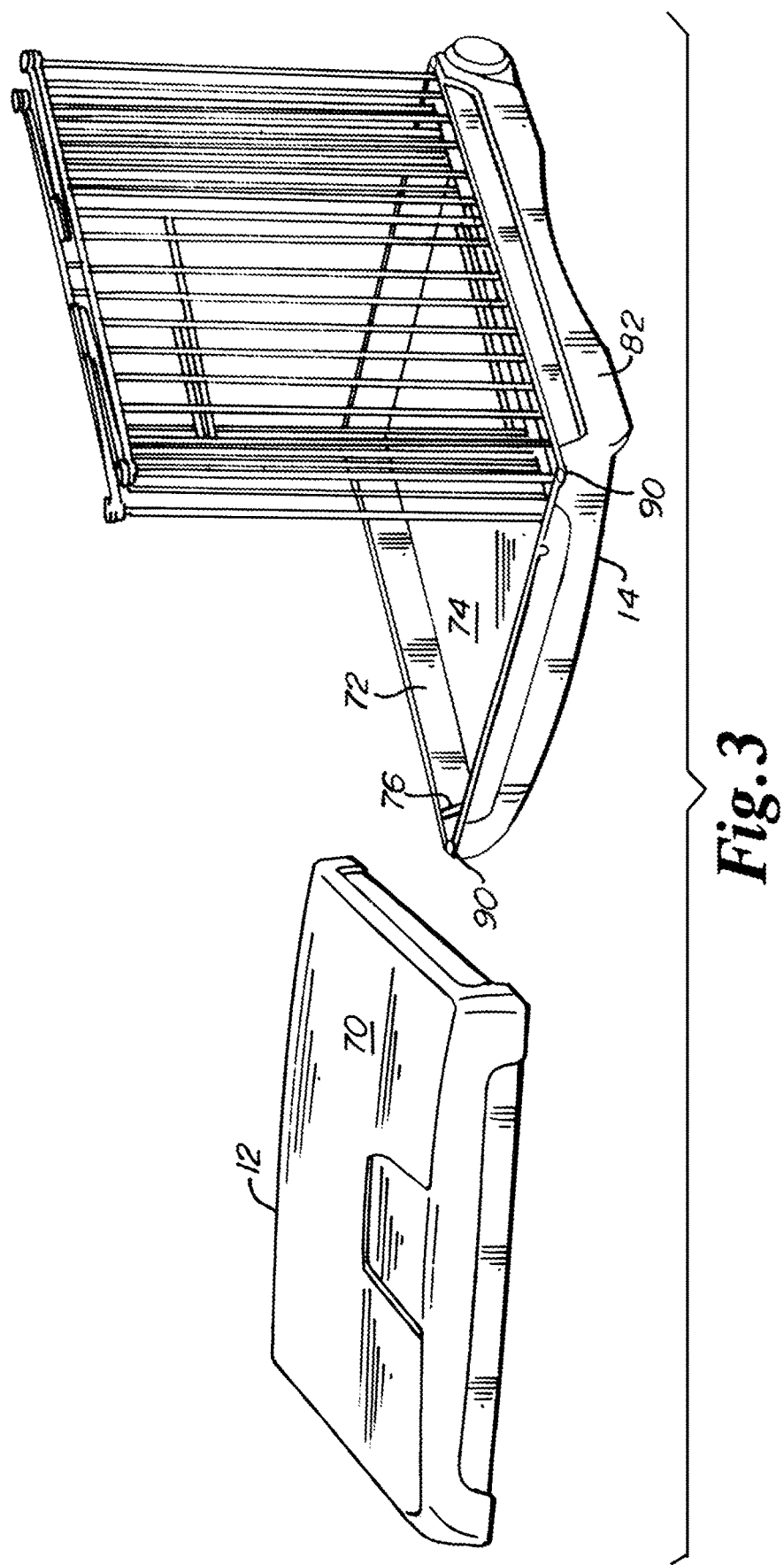
FIG. 3 is a perspective view of the pet crate of FIG. 1, showing the cage in a folded down configuration with the top snapped off the cage, with the cage upright, with the cage in the bottom, with the cage snapped free of the bottom, and with the cage fully folded to a generally flat configuration.
Figure 4:
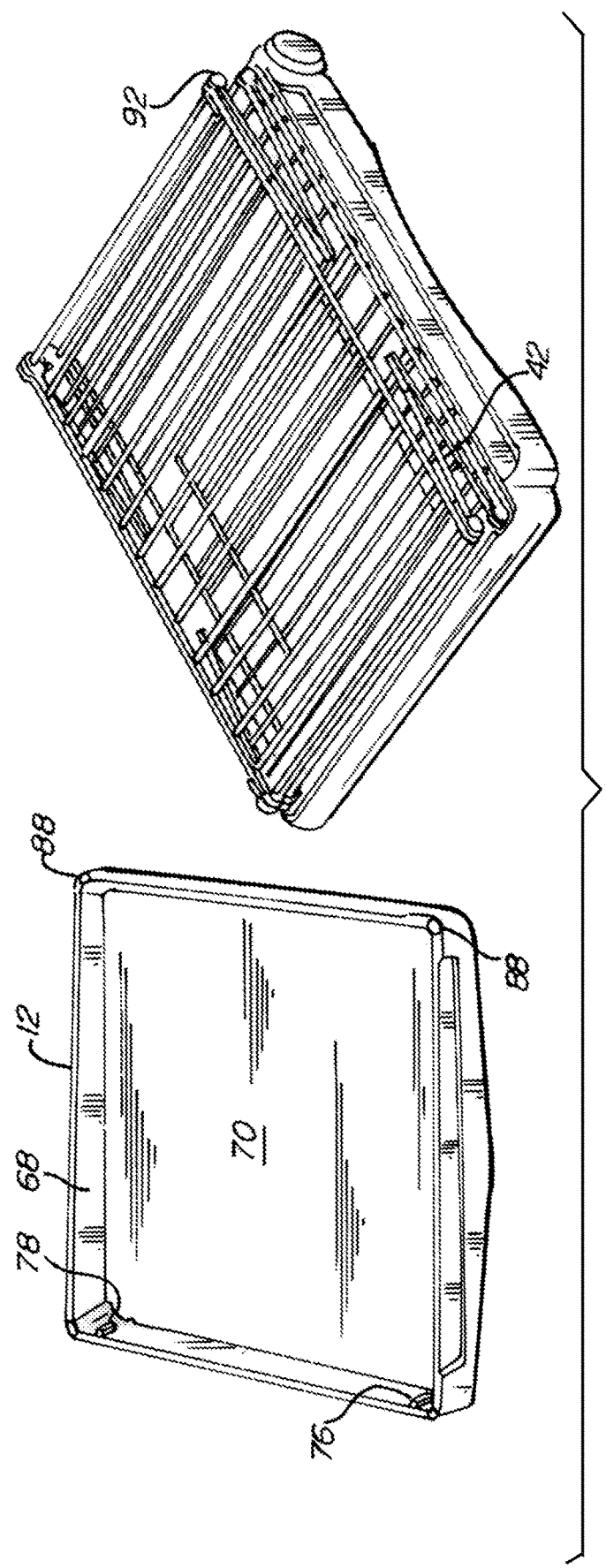
FIG. 4 is a perspective view of the pet crate of FIG. 1, showing the cage in a folded down configuration with the top snapped off the cage, with the cage in a horizontal position, with the cage in the bottom, with the cage snapped free of the bottom, and with the cage fully folded to a generally flat configuration.

As shown in FIG. 1, the present breakable down folding pet crate is indicated in general by the reference numeral 10. The pet crate 10 includes a top 12, a bottom 14, and a cage 16 engaged therebetween. Cage 16 includes a swingable gate 18. FIG. 1 shows the cage 16 in a folded out configuration. FIG. 2 shows the cage 16 in an intermediate position. FIGS. 3 and 4 show the cage 16 in a closed, generally flat configuration.

As shown in FIG. 2, cage 16 includes four sides 20, 22, 24 and 26. Each of sides 20 and 24 includes a generally horizontally extending upper member 28 and a generally horizontally extending lower member 30 that extend generally parallel to each other. The upper member 28 and lower member 30 are structurally set apart and structurally tied together by a set of generally vertically extending post members 32A. Upper and lower members 28 and 30 may be defined to include locks 66, teeth of the locks 66, and bottom post feet or cage feet 92.

Sides 20 and 24 lie in respective planes in the open, intermediate and folded down configurations. In the folded out configuration, sides 20 and 24 are spaced apart and lie generally parallel to each other. In the folded down configuration, sides 20 and 24 confront each other and lie generally parallel to each other.

Side 22 includes a pair of interior side portions 34 and 36 that are swingable relative to each other via a set of upper and lower hinges 38. Hinge 38 provides that the interior side portions 34 and 36 can swing inwardly or outwardly relative to an inside of the cage 16 and can swing relative to the other interior side portion for substantially 360 degrees. Upper hinge 38 can be a sliding hinge that in one position locks the interior portions 34, 36 relative to each other and that in another position permits swinging of the interior portions 34, 36 relative to each other. Lower hinge 38' may not be a lockable hinge.

Each of interior side portions 34, 36 includes a generally horizontally extending upper member 40 and a generally horizontally extending lower member 42. The upper member 40 and lower member 42 are structurally set apart and structurally tied together by a set of generally vertically extending post members 32, including post member 32B. Upper and lower members 40, 42 may be defined to include locks 66, teeth of the locks 66, and bottom post feet or cage feet 92.

Each of interior side portions 34, 36 further includes a horizontally extending intermediate support member 44 running for a portion of the width of its respective interior side member 34, 36. Upper member 40 and intermediate member 44 are structurally set apart and structurally tied together by short post members 46.

Gate 18, located in side 22, is swingably fixed to post member 32C. Gate 18 includes a generally horizontally extending upper member 48 and a generally horizontally extending lower member 50 that are structurally set apart and structurally tied together by a set of gate post members 52. One such post member 52 is end post member 52A. Upper member 48 of gate 18 confronts intermediate member 44, lower member 50 of gate 18 confronts lower member 42, and end post member 52A confronts post member 32D. Latch 54 is engaged to post 32D and is engagable to and disengagable from end post member 52A.

Gate 18 is disposed in one plane when the cage 16 is in the open, intermediate, and folded down configurations. Gate 18 itself does not fold. Gate 18 is disposable in a common plane with interior side portions 34 and 36 in the folded out configuration. In such a common plane, gate 18 extends into interior side portion 34 and further extends into interior side portion 36.

Side 26 includes a pair of interior side portions 56 and 58 that are swingable relative to each other via a set of upper and lower hinges 60. Hinge 60 provides that the interior side portions 56 and 58 can swing inwardly or outwardly relative to an inside of the cage 16 and can swing relative to the other interior side portion for substantially 360 degrees. Upper hinge 60 can be a sliding hinge that in one position locks the interior portions 34, 36 relative to each other and that in another position permits swinging of the interior portions 34, 36 relative to each other. Lower hinge 60 may not be a lockable hinge.

Each of interior side portions 56, 58 includes a generally horizontally extending upper member 62 and a generally horizontally extending lower member 64. The upper member 62 and lower member 64 are structurally set apart and structurally tied together by a set of generally vertically extending post members 32, including post member 32E. Upper and lower members 56, 58 may be defined to include locks 66, teeth of the locks 66, and bottom post feet or cage feet 92.

Cage 16 includes four corner post members 32P extending between lock 66 and cage feet 92. Each of the corner posts or post members 32P is a junction between two adjacent sides. Each of the corner post members 32P and its lock 66, when loosened, permit a swinging of adjacent sides for substantially 360 degrees relative to each other. Adjacent sides are sides 20, 36 and 34, 24 and 24, 56 and 58, 20. Lock 66 includes generally three parts. A first part is a set of downwardly extending teeth engaged to an upper member of one side. A second part is a set of upwardly extending teeth engaged to the upper member of an adjacent side. A third part is a turnable threaded knob that, when turned one way so as to be screwed downwardly, pushes one set of teeth into engagement with the other set of teeth, and that, when turned the other way so as to be screwed upwardly, releases or partially releases the sets of teeth from each other to permit the adjacent sides to swing relative to each other.

The upper, intermediate and lower members of the cage 16 can be formed of steel and be tubular. These members include but are not limited to members 28, 30, 32, 40, 42, 44, 48, 50, 62 and 64. Posts or post members can be formed of steel and can be tubular. These posts or post members include but are not limited to posts or post members 32, 46, 52, 32A, 32B, 32C, 32D, 32E, 32P and 52A.

Top 12 is a roof. Top 12 extends to and beyond each of the four sides 20, 22, 24 and 26 such that rainwater running off the top 12 drops to the outside of cage 16. Top 12 is receptacle shaped, as shown in FIG. 4. Top 12, when on the cage 16, is an inverted receptacle. Top 12 includes an endless lip 68. Top 12 can receive the cage 16 within the endless lip 68 without any portion of the cage 16 protruding to the outside of the lip 68. In other words, top 12 can receive the length and width of the cage 16 within the lip 68. The thickness of the cage 16, i.e., the distance between the confronting sides 20 and 24 in the folded down configuration, is greater than the depth of the lip 68. The depth of the lip 68 terminates at a ceiling 70 of the top 12.

Bottom 14, as shown in FIG. 3, extends to and beyond each of the four sides 20, 22, 24 and 26 to generally the same distance as top 12 so extends. Bottom 14 is formed in the shape of a receptacle. Bottom 14 includes an endless lip 72 having a depth terminated by a floor 74. Bottom 14 can receive cage 16 within endless lip 72 without any portion of the cage 16 protruding to the outside of the lip 72. In other words, bottom 14 can receive the length and width of the cage 16 with the lip 72. The thickness of the cage 16, i.e., the distance between the confronting sides 20 and 24 in the folded down configuration, is greater than the depth of the lip 72. Top 12 and bottom 14 can be directly engaged to each other via a snap fit or force fit, such as via male/female connections 88, 90, where a set of male members 88 integrally extend from one of the lips and where a set of female members 90 are integrally formed in the other of the lips. When so engaged, the combined depth of the top 12 and bottom 14 receives the full thickness of the cage 16.

FIG. 5 shows the snap fit or force fit between the cage 16 and bottom 14. Bottom member 14 includes an inward protrusion 76 with a lower end 78. Protrusion 76 is mounted on lip 72 and extends inwardly therefrom. Lower end 78 is spaced from the floor 74. A lower member 30 is snapable between the lower end 78 and the floor 74. Lower member 30 may be set in a plastic receiver 80 such that plastic snaps against plastic. FIG. 4 shows several locations for the inward protrusion 76 on the top 12, where end 78 is an upper end and is spaced from the ceiling 70 to permit the snap fit of upper member 28 between the end 78 and ceiling 70. Each of the top 12 and bottom 14 can have four protrusions or snaps 76. Snaps 76 in bottom 14 taper inwardly and downwardly. Snaps 76 in top 12 taper inwardly and upwardly. Since the four protrusions or snaps 76 taper inwardly, the cage 16 is resiliently slightly compressed when, for example, all four snaps 76 are engaged at the same time by members of the cage 16. If pairs of snaps 76 are engaged in sequence, the cage 16 is resiliently slightly compressed upon engagement of the second pair of snaps 76. If the snaps 76 are engaged one by one, the cage 16 is resiliently engaged upon engagement of the third and fourth snaps 76. It should be noted that after cage 16 is engaged into either the top 12 or bottom 14, cage 16 may remain somewhat resiliently compressed by the sides 20, 24 being slightly resiliently drawn inwardly toward each other.

Top 12 and lip 68 are generally formed in the shape of a square or rectangle. Bottom 14 and lip 72 are generally formed in the shape of a square or rectangle. Cage 16 is generally formed in the shape of a square or rectangle.

Hinges 60 are preferably disengagable from one of the interior side portions 56, 58 such that interior side portions 56, 58 are disengagable from each other. When interior side portions 56, 58 are engaged, cage 16 forms an endless cage 16 where side 20 is engaged to side 22, which is engaged to side 24, which is engaged to side 26, which in turn is engaged to side 22. When interior side portions 56, 58 are disengaged, the sides of cage 16 can form fence like configurations shown in FIGS. 6A, 6B, 6C, 6D, 6E, 6G, 6H and 6I.

Bottom 14 includes at least one foot 82 having a lower surface 84. Lower surface 84 lies in a plane generally parallel to the floor 74 such that the floor 74 lies generally parallel to an environmental surface on which the pet crate 10 rests. Bottom 14 further includes a wheel 86 or pair of wheels 86 mounted on an axle engaged to the bottom 14. Wheel 86 includes a circumference that is disposed above the plane of the lower surface 84 of the foot 82 when the pet crate 10 is resting on said environmental surface. When pet crate 10 is slightly tipped back, the plane of the lower surface 84 is also tilted, and the wheel 86 engages the environmental surface such that the pet crate 10 may be wheeled.

In operation, to set up the pet crate 10 from a storage configuration where the cage 16 is sandwiched between the top 12 and bottom 14, the top 12 is unsnapped from the bottom 14 and laid aside, as shown in FIG. 4. Then the folded cage 16 is lifted upright and, at this point in time, member 30 of side 20 may be engaged to the pair of snaps 76 on one side of the lip 72. Then side 24 may be pulled away from side 20 so as to begin to expand the cage 16. Side 24 may be further pulled so as to fully expand the cage 16, whereupon the remaining pair of snaps 76 are engaged, or one or more of interior side portions 34, 36, 56, 58 of sides 22 and 26 may be pulled out so as to fully expand the cage 16, whereupon the remaining pair of snaps 76 are engaged. Upper hinges 38 and 60 are locked so as to fix the cage 16 in the folded out configuration. Locks 66 may be turned if desired to fix in a nonswinging and nonpivoting manner sides 20, 36 and 34, 24 and 24, 56 and 58, 20 relative to each other. Gate 18 may be latched or left open. Then top 12 is snapped to upper members 28 of sides 20 and 24 via the snaps 76 so as to complete the portable pet crate 10 as shown in FIG. 1.

In use, the pet crate 10 may be tipped and wheeled. The pet crate 10 may be used as a portable or temporary or permanent dog house with a roof and a floor. Or the top 12 and bottom 14 may be removed and the cage 16 utilized as a play yard, as shown in FIG. 6F. Or the top 12 and bottom 14 may be removed and hinges 60 may be disengaged so as to disengage interior side portions 56 and 58 from each other to provide a barrier or fence as shown in FIGS. 6A, 6B, 6C, 6D, 6E, 6G, 6H, and 6I. Or only the top 12 may be removed where, for example, the pet crate 10 has a height too great for the back of a station wagon. Or only the bottom 14 may be removed to provide a shelter with a natural grass floor. In the play yard and fence configurations, locks 66 may be turned if desired to fix in a nonswinging and nonpivoting manner sides 20, 36 and 34, 24 and 24, 56 and 58, 20 relative to each other and hinges 38 and 60 may be locked if desired.

Breaking down or disassembling the pet crate 10 is the opposite of set up or assembly. The top 12 is removed. The hinges 38 and 60 are unlocked and the locks 66, if tightened, may be loosened. One or both of the sides 20 and 24 is unsnapped from snaps 76. Cage 16 is folded by drawing in the sides 22 and 26 such that interior side portions 34, 36 swing relative to each other and such that interior side portions 56, 58 swing relative to each other. Cage 16 is then fully folded such that side 20 confronts side 24, such that interior side portions 34, 36 confront each other as well as sides 20 and 24, and such that interior side portions 56, 58 confront each other as well as sides 20 and 24. In this fully folded position, gate 18 confronts at least a portion of each of the sides, 20, 36, 34, 24, 56, and 58. Then, unless already unsnapped, the remaining side 20 or 24 is unsnapped from snaps 76. Then the folded cage 16 is laid horizontally within the receptacle of the bottom 14. Then the receptacle of the top 12 is placed over the cage 16 and the top 12 and bottom 14 are snapped together. In this stored configuration, the pet crate 10 may be wheeled or carried.

A detent is a mechanism that temporarily keeps one part in a certain position relative to that of another, and can be released by applying force to one of the parts, where this definition of a detent does not involve moving or rotating parts. The snap fit or force fit 76 of the cage into the top 12 and into the bottom 14 can be referred to as a detent fit, where at least four detents 76 are formed in the bottom 14, where at least four detents 76 are formed in the top 12, and where cage members snap into and out of the detents 76.

It should be noted that the phrase "folded down configuration" refers to a folded configuration that is generally flat and where opposing sides 20, 24 of the cage 16 confront each other. The phrase "intermediate configuration" refers to an endless configuration where the sides are beginning to unfold (or beginning to fold) and where the ends are engaged to each other and where the configuration takes generally a dovetail shape. The phrase "folded out configuration" refers to a nonfolded endless configuration where the ends are engaged to each other and the cage 16 is in the form of a square or rectangle. The phrase "fence configuration" refers to an opened up configuration where the ends or interior side portions 56, 58 are disconnected from each other and may be in the form of a stand alone zig-zag fence.

In one aspect of the present invention, the breakable down folding pet crate 10 includes a top 12, a bottom 14, and a cage 16 between the top 12 and bottom 14. The cage 16 is engagable to and disengagable from each of the top 12 and bottom 14. The cage 16 has a folded out configuration where opposing sides 20 and 24, or opposing sides 22 and 26, of the cage 16 are spaced apart. The cage 16 has a folded down configuration where opposing sides 20 and 24, or opposing sides or side portions 34, 36, or opposing sides or side portions 56, 58 of the cage 16 confront each other. The cage 16 when disengaged from at least one of the top 12 and bottom 14 is foldable between the open and folded down configurations.

The cage 16 includes sides 20, 22, 24, 26, 34, 36, 56, 58 and each of these sides is swingable relative to an adjacent side to fold the cage 16 between the open and folded down configurations. The cage 16 in the folded out configuration is removably force fit into each of the top 12 and bottom 14. The cage 16 in the folded out configuration includes at least four sides 20, 22, 24, 26, with adjacent sides 20, 22 and 22, 24, and 24, 26 and 26,20 in the folded out configuration being generally disposed at right angles to each other, and with opposing sides 20, 24 and 34, 58 and 36, 56 in the folded out configuration being generally disposed parallel to each other. The cage 16 in the folded down configuration includes six sides 20, 22, 24, 26, 34, 36, 56, and 58, with adjacent sides 20, 36 and 34, 24 and 24, 56 and 56, 58 and 58, 20 in the folded down configuration being generally disposed at acute angles to each other.

The cage 16 includes an intermediate configuration between the open and folded down configurations. The cage 16 in the intermediate configuration includes six sides 20, 22, 24, 26, 34, 36, 56, and 58. The cage 16 in the intermediate configuration has generally a dovetail shape when viewed from above. The cage 16 includes folding sides 22 and 26 and nonfolding sides 20, 24, 34, 36, 56, and 58. The folding sides 22 and 26 oppose each other, the nonfolding sides 20 and 24 oppose each other, the nonfolding sides 36 and 58 oppose each other, and the nonfolding sides 34 and 56 oppose each other.

The cage 16 includes four corners or four corner posts 32P in the folded out configuration. The cage 16 includes at least four sides 20, 22, 24 and 26, where each of the sides 20, 22, 24 and 26 are between two of the corners or corner posts 32P. Each of the sides 20, 22, 24 and 26 are swingable relative to two respective adjacent sides, and at least one of the sides 22 and 26 have interior side portions 34, 36, 56 and 58 that are swingable relative to each other.

Cage 16 includes at least one side 20, 24, 34, 36, 56, 58 where such side lies generally in a plane in each of the open and folded down configurations. Cage 16 includes at least one side 22 and 26 having respective interior side portions 34, 36 and 56, 58 where each such pair of interior side portions lie generally in a plane in the folded out configuration, where each such pair of interior side portions swing relative to each other, and where each such pair of interior side portions in the folded down configuration confront each other.

At least one side 22 of the cage 16 includes a gate 18. The gate 18 is swingable into and out of a plane with the interior side portions 34, 36 when the cage 16 is in the folded out configuration. The gate 16 extends into a section of each of the interior portions 34, 36 when the gate is in the folded out configuration and when the gate 16 is in a common plane with the interior sections 34, 36.

The cage 16 includes at least one side 22 with interior side portions 34, 36. Each of the interior side portions 34, 36 is defined by right and left ends, with one such end being defined by a corner post 32P and with another such end being defined by a short corner post 46 combined with an inner ends of members 40 and 42 that engage hinges 38. Each of the interior side portions 34, 36 includes an interior post such as 32P or 32B or 32C between each of the right and left ends. The cage 16 further includes the gate 18, with the gate 18 extending between the interior posts 32P or 32B or 32C when the cage 16 is in the open position and the interior side portions 34, 36 and the gate 18 are in a common plane.

Top 12 includes a receptacle or is receptacle shaped. Cage 16 in the folded down configuration is disposable in the receptacle at least along the width and length of the cage 16. Bottom 14 includes a receptacle or is receptacle shaped. Cage 16 in the folded down configuration is disposable in the receptacle at least along the width and length of the cage 16. The receptacle of each of the top 12 and bottom 14 includes a respective generally endless lip 68, 72. Cage 16 is disposable within the respective generally endless lip 68, 72 at least along the width and length of the cage 16.

The top 12 is engagable to and disengagable from the bottom 14 via a force fit mechanism 88, 90. The cage 16, including the length, width, and thickness of the cage 16, is disposable between and within the top 12 and bottom 14 when the top 12 and bottom 14 are engaged to each other.

Cage 16 includes two ends, such as the inner ends of interior side portions 34, 36, or the inner ends of interior side portions 56, 58. The two ends of cage 16 may also be defined as the respective confronting ends of sides 20 and 36, sides 34 and 24, sides 24 and 56, sides 58 and 20, where such two ends may be disengaged from each other by removing lock 66, turning lock 66 fully in the loosening direction, taking lock 66 off the corner post 32P, lifting lower end of corner post 32P out of a hole or depression in a cage pivot foot 92, and drawing the corner post 32P out of the sets of upper teeth, one set of each being engaged to a respective side. The corner post 32P and lock 66 may then be reengaged to one of the side ends. The two ends are engagable and disengagable from each other such that cage 16 can form an endless structure when the ends are engaged to each other and such that the cage 16 can form a fence when the ends are disengaged from each other and when the cage 16 is disengaged from each of the top 12 and bottom 14.

Cage 16 includes sides 20, 22, 24, 26, 34, 36, 56, 58. Cage 16 includes two ends as defined above and the two ends are engagable to and disengagable from each other. Each of the sides 20, 22, 24, 26, 34, 36, 56 and 58 are swingable relative to an adjacent side to fold the cage 16 from the folded out configuration to the folded down configuration when the two ends are engaged to each other and when the two ends are disengaged from each other. Cage 16 can form a self-standing zig-zag fence structure when the two ends are disengaged from each other.

In the folded down configuration, the cage 16 forms a generally flat structure. Cage 16 includes two ends engagable to and disengagable from each other as defined above. Cage 16 can form a generally flat structure and at the same time an endless structure when the two ends are engaged or disengaged from each other.

Top 12 is or includes a roof structure. Cage 16 includes a side 20, 22, 24, 26, 34, 36, 56, 58 lying in a plane. Top or roof structure 12 extends beyond the plane such that rainwater running off the top or roof 12 falls outside of an inside of the cage 16.

Bottom 14 includes the floor 74. Floor 74 has a perimeter or lip 72 that confronts the cage 16. Floor 74 is generally solid between any two points on the perimeter 72 to isolate the floor 74 from an environmental surface upon which the breakable down folding pet crate 10 rests. Likewise, ceiling 70 is generally solid between any two points on the lip or perimeter 68 to provide for shade and thwart rain.

Top 12 and bottom 14 may be formed of plastic. Top 12 and bottom 14 may be thin walled blow molded pieces. Snaps 76 and male/female connections 88, 90 are integral and one-piece with their respective top 12 and bottom 14.

Top 12 and bottom 14 may include depressions or profiles to receive therein locks 66 and cage feet 92. These depressions or profiles may be elongate and run along two sides of each of lips 68 and 72 to accommodate drawing in and drawing out sides 20 and 24.

Upper hinges 38 and 60 may be opposing surface offset center pin hinges.

It should be noted that one or more of sides 20, 36, 34, 24, 56, and 58 may be formed of a combination of 1) sheeting or fabric and 2) tubing.

Figure 7:
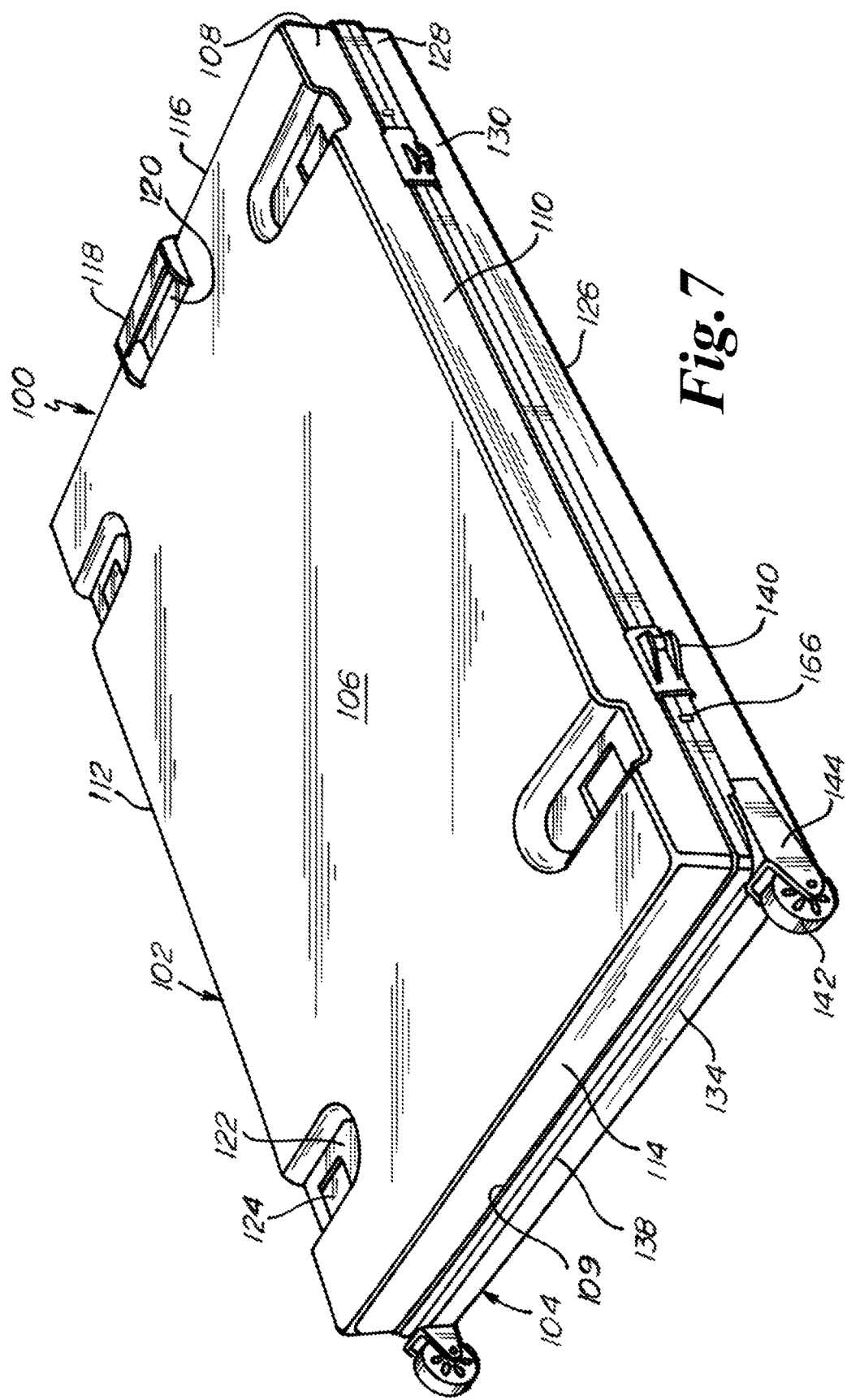
FIG. 7 is a perspective view of an improved version of the pet crate of FIG. 1.

An improved version of the present pet crate is shown in FIG. 7. Here improved pet crate 100 includes a crate top 102, a crate bottom 104, and a cage 105 between the crate top 103 and crate bottom 104. Cage 105 is shown in, for example, FIGS. 13A and 13B. Crate top 102 is formed in the shape of a receptacle or inverted receptacle. Crate top 102 includes a ceiling or roof 106 and an endless sidewall 108 extending about the roof 106. Endless sidewall 108 includes first and second opposing and parallel sides 110, 112 and further includes first and second opposing and parallel ends 114, 116. Endless sidewall 108 includes a lip 109 that extends downwardly and outwardly.

Crate top 102 further includes a handle 118 for picking up and wheeling the pet crate 100. Handle 118 is formed integrally and one-piece with crate top 102. Handle 118 runs parallel to end 116 and parallel to a plane in which an upper surface of the roof 106 lies. Handle 118 is spaced from the plane of the upper surface of roof 106 and a depression 120 is formed in the roof 106 and in the end 116 to form a space for the insertion of a hand when grabbing onto the handle 118.

Crate top 102 further includes four cavities or wells 122. Each of the cavities 122 sinks downwardly from the upper surface of the roof 106. Each of the cavities 122 opens out into one of the sides 110, 112. Generally centered in each of the cavities 122 is a snap or latch 124. Two of the cavities 122 confront and lead out of side 110. Two of the cavities 122 confront and lead out of side 112. The cavity 122 isolates the snap 124 and protects the snap 124 from being operated unintentionally.

Figure 8A:
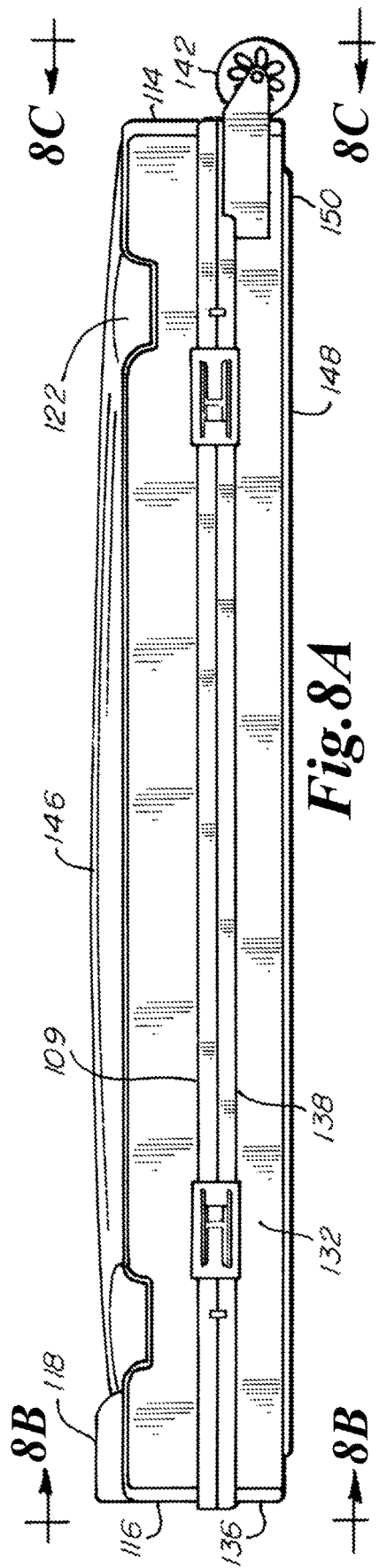
FIG. 8A is a side view of the pet crate of FIG. 7.

Crate bottom 104 is further shown in FIG. 7. Crate bottom 104 is formed in the shape of a receptacle. Crate bottom 104 includes a floor 126 and an endless sidewall or lip 128 extending about the floor 126. Endless sidewall 128 includes first and second opposing and parallel sides 130, 132 and further includes first and second opposing and parallel ends 134, 136. Side 132 and end 136 are shown in FIG. 8A. Endless sidewall 128 includes a lip 138 that extends upwardly and outwardly. When the crate top 102 engages crate bottom 104, lips 109, 138 confront and abut each other.

A set of four slides 140 engage the lips 109, 138 and move into and out of locked and unlocked positions for locking and unlocking the crate top 102 to the crate bottom 104. Two slides 140 are engaged on sides 110, 130 and two slides on engaged on sides 112, 132.

FIG. 7 further shows a pair of wheels 142 for wheeling the cart. The pet crate 100 may be picked up by the handle 118 and then wheeled via the wheels 142 to its destination. Each of the wheels 142 is journaled in a wheel housing 144 that is engaged to the crate bottom 104. A portion of each of the housings 144 extends from end 134. Another portion of one of the housing extends from side 130, and another portion of the other housing extends from side 132 such that the distance between the wheels 142 is about the width of the pet crate 100 to provide for stable wheeling without tipping. The wheels 142 are coaxial and define an axis that lies beyond and parallel to end 134 of crate bottom 104.

Figure 8B:
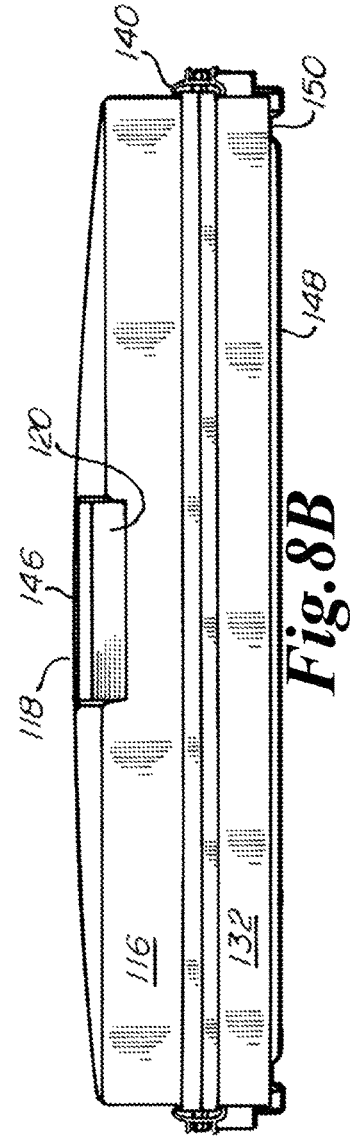
FIG. 8B is an end view of one of the ends of the pet crate of FIG. 7.
Figure 8C:
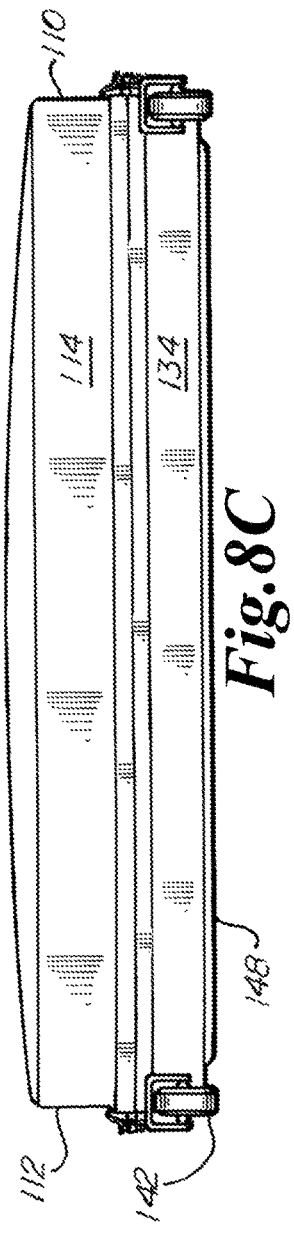
FIG. 8C is an end view of the other of the ends of the pet crate of FIG. 7.

FIG. 8A is a side view of the pet crate 100 when closed and shows that the roof 106 of the pet crate top 102 has a slight curvature that runs from end 114 to end 116 with an apex 146 of the curvature occurring intermediate the ends 114, 116 at about midway between the ends 114, 116. This curvature is also shown in FIGS. 8B and 8C that show the curvature running between sides 110, 112 with the apex 146 intermediate the ends 110, 112 to lie about midway between the ends 114, 116. Such a curvature permits moisture such as rain or dew to run downwardly off the crate top 102. The upper surface and the lower surface of the ceiling or roof 106 may be an arc shape or conic shape. The curved or arc or conic shape is one feature that lends strength to the crate top 102. Another feature that lends strength to the crate top 102 are the ribs 152.

FIGS. 8A, 8B and 8C further show that the floor 126 of the crate bottom 104 includes a lower portion 148 and an upper portion 150. Upper portion 150 is a peripheral portion running about the crate bottom 104 and confronts and leads into the endless sidewall 128 of the crate bottom 104. Lower portion 148 is set inwardly and downwardly from the upper portion 150. When the crate bottom 104 is set on an environmental surface such as grass, cement, wood, tile or carpet, the lower portion 148 abuts such environmental surface. Lower portion 148 lies generally in a plane and a circumference of wheel 142 is tangential to this plane, as shown in FIGS. 8A, 8B and 8C.

Figure 9:
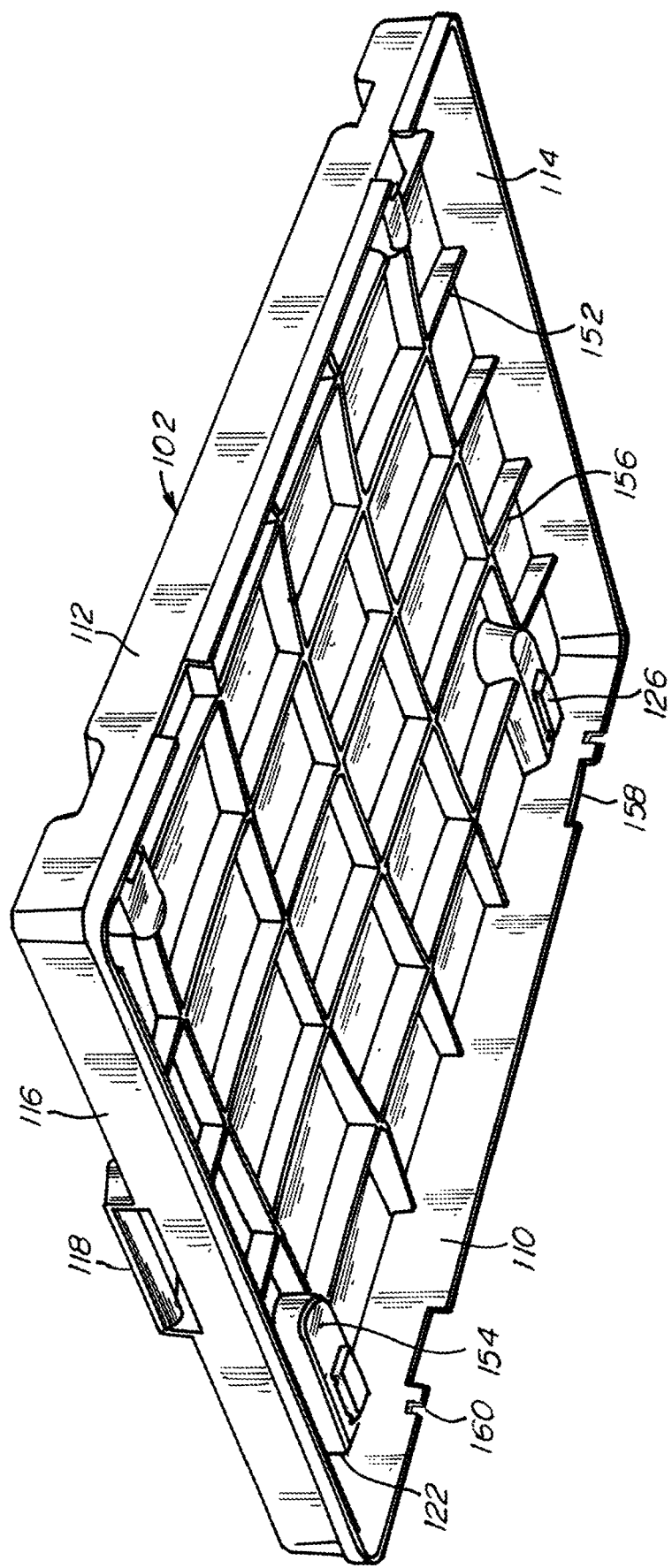
FIG. 9 is a perspective view of the top of the pet crate of FIG. 7.

FIG. 9 is a perspective view from underneath the crate top 102 and shows a set of intersecting ribs 152 formed integrally and one-piece with the crate top 102. Some of the ribs 152 extend from side 110 to 112. Some of the ribs 152 extend from end 114 to end 116. Some of the ribs 152 extend from the cavities 124. Some of the ribs 152 extend from the underside of the depression 120 that confronts the handle 118. Ribs 152 strengthen and stiffen the crate top 102 while minimizing the weight of the crate top 102.

Figure 13B:
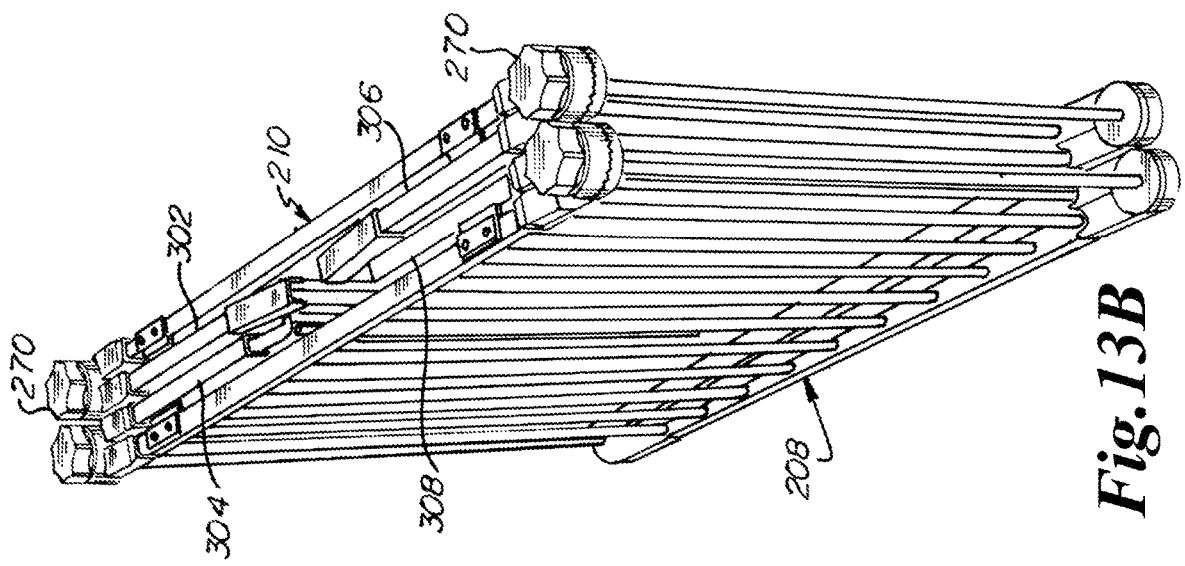
FIG. 13B is a perspective view of the cage of FIG. 12A in the folded down configuration.

Ribs 152 further support the crate top 102 relative to the cage 105 both when the cage 105 is in the folded out configuration shown in FIG. 12A and when the cage 105 is in the folded down configuration shown in FIG. 13B. Each of the cavities 122 includes an undersurface 154 and this undersurface 154 is generally coplanar with the lowermost edges 156 of the ribs 152. When the cage 105 is in the folded out configuration, snap 126 snaps or clips an upper horizontal member of the cage 105 against the undersurface 154 and such upper horizontal member of the cage 105 confronts and abuts the lowermost edges 156 of the ribs 152. When the cage 105 is in the folded down configuration, sides of the cage 105 confront and abut the lowermost edges 156 of the ribs 152 of the crate top 102 and also confront and abut the floor 126 of the crate bottom 104 to minimize movement or play of the cage 105 when packed in the pet crate 100.

Crate top 102 further includes cutouts 158, 160. Cutout 158 is a relatively large cutout and is rectangular in shape. Two cutouts 158 are formed in lip 109 on side 110 and two cutouts 158 are formed in lip 109 on side 112. Cutout 158 receives lower lip extension 162, shown in FIG. 10A, that extends from lip 138 and serves as a mount for slide 140 when slide 140 is in the unlocked position. Cutout 160 is spaced from cutout 158 and yet confronts cutout 158. Each of the cutouts 158 is adjacent one of the ends 114, 116 and the cutout 160 associated with its respective cutout 158 is positioned between such cutout 158 and the end 114, 116 to which such cutout 158 is adjacent. Cutout 158 has a height about the height of lip 109. Cutout 160 has a height intermediate the height of the lip 109.

FIG. 10A is a perspective view of the crate bottom 104. FIG. 10A shows four rectangular lower lip extensions or slide mounts 162. Lower lip extensions or slide mounts 162 are one-piece and integral with lip 138 and crate bottom 104. Lower lip extensions or slide mounts 162 mount the slides 140 when the slides are in the unlocked position, such as when the crate bottom 104 is about to be removed from the crate top 102, and such as when the crate bottom 104 is separate from the crate top 102. Lower lip extensions or slide mounts 162 are received in cutouts 158 when the crate top 102 comes together and aligns with the crate bottom 104, whereupon slide 140 can slide at least partially off its respective mount 162 and toward relatively small cutout 160 along the confronting lips 109, 138.

FIG. 10A further shows a set of four relatively small cutouts 164. Each of the cutouts 164 confronts and is spaced apart from one of the slide mounts 162. Each of the cutouts 164 is intermediate the slide mount 162 to which it is adjacent and the end 114, 116 to which it is adjacent. When the crate top 102 and the crate bottom 104 come together and are aligned, each of the cutouts 164 is aligned with one of the cutouts 160 to form a slot 166, as shown in FIG. 7, for reception of a resilient portion or resilient tongue of the slide 140 when the slide 140 is in the locked position.

FIG. 10A further shows the upper peripheral floor portion 150 and the lower inner floor portion 148. The upper peripheral floor portion 150 serves as a mount or stand for the posts or feet of the cage 105. The offset of the floor 126 that is provided by the offsetting floor portions 148, 150 serves to strengthen and rigidify the floor 126. The lower portion 148 also serves to isolate the cage 105 from surface imperfections in an environmental surface, such as dirt, gravel, rocks, grass and sod that may manifest themselves through the floor 126 and may otherwise provide for an uneven mount for the cage 105.

FIG. 10A further shows boss or undercut 168. Two of bosses 168 extend inwardly from the inner surface of end 114. Two other bosses 168 extend inwardly from like positions on end 116. An undersurface of the boss 168 is spaced from upper floor portion 150 to capture therebetween a lower horizontal member of cage 105 to engage cage 105 to the crate bottom 104. Bosses 168 of one end 114 or 116 are spaced from each other. Each of the bosses 168 is adjacent to and spaced from one of the sides 110, 112. Each of the bosses is spaced from and adjacent to an upper edge of lip 138.

FIG. 10B shows that each of the bosses 168 is triangular in section such that one face of the boss 168 is engaged to end 114 or end 116, such that another face of the boss 168 confronts the lower horizontal member of the cage 105, and such that another face of the boss tapers inwardly and downwardly from its respective end 114, 116 such that lower horizontal members of the cage 105 slide downwardly to the floor 126 instead of being caught above the floor 126. FIG. 10B shows that boss 168 engages a lower horizontal member of the cage 105 at a location between vertical running members of the cage 105.

FIG. 11A shows the crate top 102 and crate bottom 104 coming together into alignment such that cutout 158 is about to receive slide mount 162 (hidden behind slide 140 in FIG. 11A). FIGS. 11A and 11B further shows that lip 109 includes a lower V-shaped or knife edge 170 that engages a V-shaped channel 172 formed in the upper edge of lip 138 such that endless sidewall 108 of the crate top 102 is aligned with the endless sidewall 128 of the crate bottom 104. The V-shaped edge 170 and the V-shaped channel 172 preferably does not run continuously about the lips 109, 138. The V-shaped edge 170 and the V-shaped channel 172 preferably runs between 50% and 100% along each of the sides 110, 112, 130 and 132 and preferably runs between 50% and 100% along each of the ends 114, 116 and 134, 136.

FIG. 11C shows a channel 174 that is formed along the upper edge of lip 109 for receiving an upper edge 176 of slide 140. A like channel is formed along the lower edge of lip 138 for receiving lower edge 178 of slide 140. As shown in FIG. 11C, slide 140 includes a C-shaped body 180. Body 180 includes a tongue 182 with a tab 184 (shown in FIG. 10A) on a distal end of the tongue 182. Tab 184 extends inwardly to engage, in the locked position, slot 166. Tab 184 in the unlocked position engages slot 186 that is formed in the slide mount 162 and is shown in FIG. 11B. The distal end of tongue 182 is resiliently drawable outwardly to draw tab 184 out of either of the slots 166 or 186. Such is facilitated by a finger hook 188, shown in FIG. 11C, that is formed on the distal end of the tongue 182 opposite of the tab 184 and extends in the outer direction. Slide 140 further includes guards or fenders 190 extending on both sides of the tongue 182 to minimize unintended disengagement of the tab 184.

FIGS. 11C and 11D shows details of the snap 124. Snap 124 is set in an opening 192 in cavity 122. Snap 124 rides or slides on side edges of the opening 192 from a rear edge portion 194 to a front edge portion 196. A coil spring 198 set in the body of the snap 124 biases the snap 124 toward the front edge portion 196 via a prong of the coil spring 198 being set against a portion of the edge of the opening 192 of the cavity 122 of the crate top 102. Snap 124 further includes a ledge 200 for receiving an extension 202 of a metal piece 203 engaged to a horizontal upper member 216 of the cage 105. Snap 124 further includes an angled surface 204 that leads into the ledge 200. In combination, ledge 200 and angled surface 204 form an acute angle. When the crate top 102 is placed on top of the cage 105, extension 202 hits the angled surface 204, which in turn urges the snap 124 inwardly toward the rear edge portion 196 until the extension 202 clears the angled surface 204, whereupon with resistance being cleared the snap 124 snaps forwardly toward the front edge portion 196 and the ledge 200 comes to rest under the extension 202, which secures the crate top 102 to the cage 105. To release the crate top 102 from the cage 105, the snap 124 includes a finger hole 206, into which a finger may be inserted to draw the snap 124 toward the rear edge portion 194, thereby drawing the ledge 200 inwardly until the ledge 200 clears the extension 202 whereupon the crate top 102 can be lifted off the cage 105.

Figure 13A:
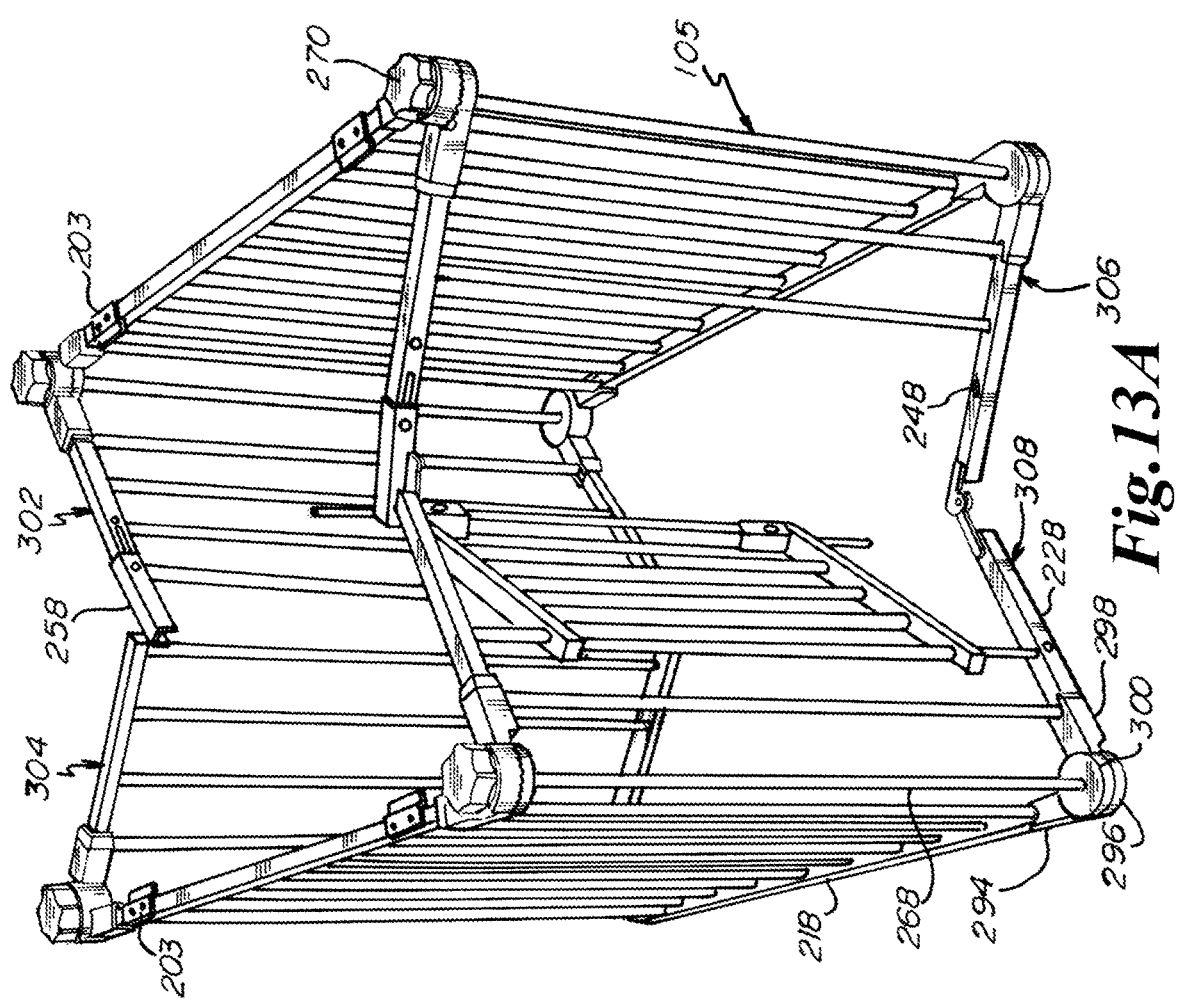
FIG. 13A is a perspective view of the cage of FIG. 12A beginning to fold from a folded out configuration to a folded down configuration.
Figure 15B:
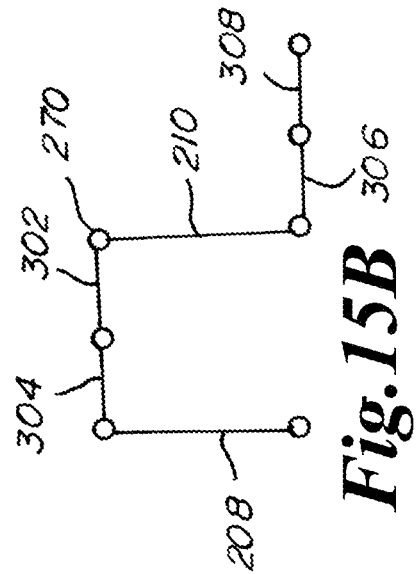
FIG. 15B is a schematic top view of the cage of the pet crate of FIG. 12A, showing the cage in a stand alone fence configuration, where the fence takes the shape of an inverted pan.
Figure 15A:
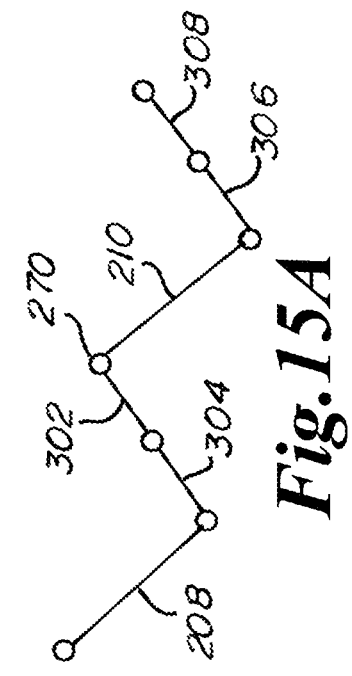
FIG. 15A is a schematic top view of the cage of the pet crate of FIG. 12A, showing the cage in a stand alone fence configuration, where the fence takes a zig-zag shape and adjacent cage sides are disposed generally at right angles to each other.
Figure 15D:
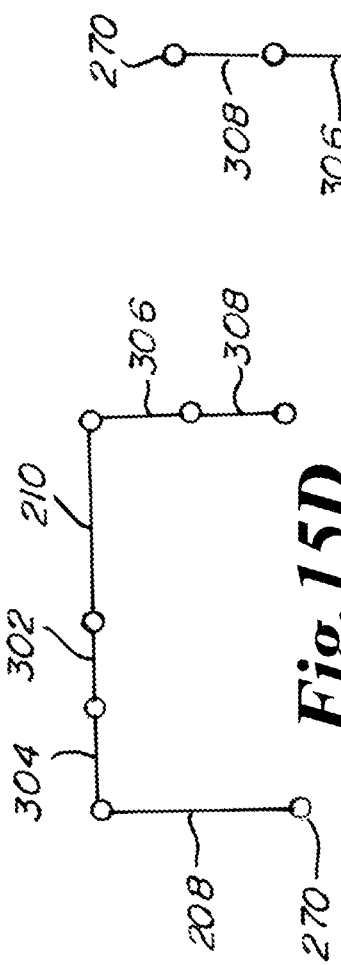
FIG. 15D is a schematic top view of the cage of the pet crate of FIG. 12A, showing the cage in a stand alone fence configuration, where the fence takes the shape of an inverted U.
Figure 15C:
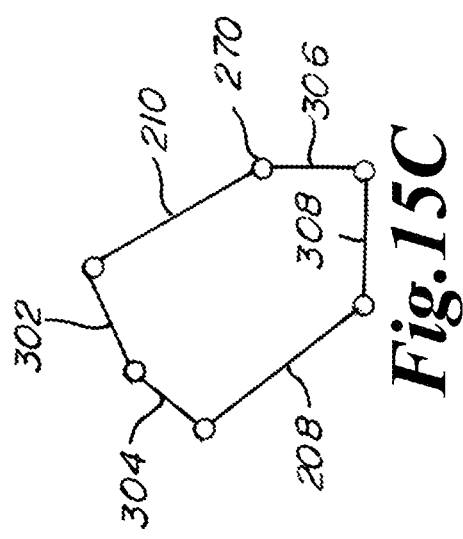
FIG. 15C is a schematic top view of the cage of the pet crate of FIG. 11A, showing the cage in a stand alone playyard configuration, where the playyard takes a hexagon shape.
Figure 15F:
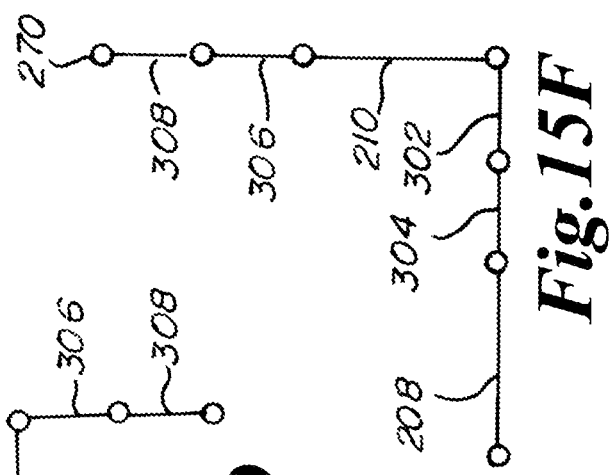
FIG. 15F is a schematic top view of the cage of the pet crate of FIG. 12A, showing the cage in a stand alone fence configuration, where the fence takes a reverse L-shape.
Figure 15E:
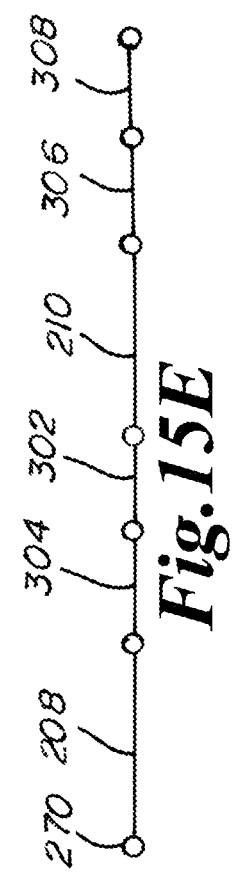
FIG. 15E is a schematic top view of the cage of the pet crate of FIG. 12A, showing the cage in a stand alone fence configuration, where the fence takes a rectilinear shape.

FIGS. 12A, 13A and 13B show the cage 105. FIG. 12A shows the cage 105 in the folded out configuration. FIG. 13B shows the cage 105 in the folded down configuration. FIG. 13A shows the cage 105 in an intermediate configuration between the folded out and folded down configurations.

Cage 105 includes first and second opposing sides 208, 210. Each of first and second sides 208, 210 remain in a plane in each of the folded out and folded down configurations. First and second sides 208, 210 remain parallel to each other in each of the folded out and folded down configurations. Cage 105 includes third and fourth opposing sides 212, 214. Each of sides 212, 214 is a folding side, as shown in FIGS. 13A and 13B.

Each of the sides 208, 210 includes a horizontally extending upper member 216 and a horizontally extending lower member 218 that extend parallel to each other. The upper member 216 and lower member 218 are structurally set apart from each other and structurally tied together by a set of vertically extending post members 220.

Each of the sides 212, 214 includes a pair of horizontally extending upper members 222, 224 and a pair of horizontally extending lower members 226, 228. Upper members 222, 224 are swingably engaged via a hinge 230 and lower members 226, 228 are swingably engaged via a hinge 230. Hinge 230 is engaged to the inner ends of members 222, 224, 226 and 228. Upper members 222, 224 are structurally set apart from and structurally tied to their respective lower members 226, 228 by a set of vertically extending post members 232.

Cage 105 includes a gate 234 in side 212. Gate 234 includes an upper horizontal member 236, a lower horizontal member 238, and a vertical member 240. Gate 234 further includes a set of vertical post members 242 which, along with vertical member 240, are engaged to and between upper horizontal member 236 and lower horizontal member 238. One end of the gate 234 is swingably engaged to a post 232 extending between upper member 224 and lower member 228.

The other end of the gate 234 includes vertical member 240. Vertical member 240 is tubular and includes therein an upper foreshortened slideable post member 244 and a lower foreshortened slideable post member 246. Each of the slideable post members 244, 246 can engage an opening 248, shown in FIG. 13A, formed in its respective upper and lower members 222, 226. Opening 248 is a closed opening such that the upper end of upper post member 244 extends through a bottom portion of tubular upper member 222 and abuts the upper portion of tubular upper member 222 and such that the lower end of lower post member 246 extends through an upper portion of tubular lower member 226 and abuts the lower portion of tubular lower member 246. A coil spring 248 is engaged in the vertical member 240 between a rivet or pin 250 fixed to vertical member 240 and a rivet or pin 252 fixed to a U-shaped handle slide 254 on the vertical member 240. A vertical slot 256 extends through the vertical member 240 and rivet 252 extends through slot 256 to engage the U-shaped slide 254 to the vertical member 240. Rivet 252 is engaged to the bottom end of upper post member 244. Via the coil spring 248, the upper end of upper post member 244 is biased in the closed position to normally be engaged in hole 248 set in the upper horizontal member 222. To draw the upper end of upper post member 244 out of engagement with upper member 222, the U-shaped handle slide 254 is gripped and slid downwardly. It should be noted that lower post member 246 is operated in the same manner and includes its own set of parts, including a coil spring 248, rivets or pins 250, 252, U-shaped slide 254, and slot 256.

A sliding lock 258 is engaged between upper members 222, 224. Lock 258 is U-shaped to extend over two side portions and an upper portion of the upper members 222, 224. Lock 258 includes a coil spring 260 extending between two rivets or pins 262, 264. Pin 262 is engaged to and extends through upper member 222. Pin 264 is engaged to and extends through sliding lock 258 and further extends through a slot 266 formed in upper member 222. Coil spring 260 brings pressure to bear upon pin 264 to normally keep sliding lock 258 in a locked configuration where lock 258 is disposed over each of an inner end of member 224 and an inner end of member 222. When the lock 258 is slid by hand toward pin 262, upper members 222 and 224 can be swung relative to each other when lock 258 is slid off the inner end of upper member 224. When lock 258 is released, lock 258 slides automatically back over the inner end of upper member 224 if upper members 222, 224 are rectilinear, such as when the cage 105 is in the folded out configuration.

Sides 208, 210, 212, and 214 have intersections or junctures and share vertical corner posts 268 at these junctures. At these four corner posts 268, sides 208, 210, 212, and 214 are swingable relative to their adjacent sides when corner post locks 270 are unlocked. As shown in FIG. 12B, corner post lock 270 includes a receptor 272 for receiving and engaging an end of upper member 216 and a receptor 274 for receiving and engaging an end of upper member 224. Receptor 272 is integral and one-piece with a first jaw 276. First jaw 276 includes a circular set of upwardly extending endless teeth. First jaw 276 further includes a central upwardly extending collar having a central threaded through opening 278 through which corner post 268 extends.

Receptor 274 includes an outer, partially annular end 280 that fits over the central upwardly extending collar of the first jaw 276. End 280 includes a through opening for reception of a threaded stem 282 of a knob 284. Receptor 274 further includes a neck 286 intermediate the outer end 280 and an opening 288 for reception of upper member 224.

Corner post lock 270 further includes a second jaw 290. Second jaw 290 includes a circular set of downwardly extending endless teeth for engaging with the circular set of upwardly extending endless teeth of the first jaw 276. Second jaw 290 further includes a central opening for reception stem 282 and a cutout 292. Cutout 292 receives and engages the neck 286 of the receptor 274.

When knob 284 is turned, stem 282 threadingly mates with threads 278 of the collar of the first jaw 276. This draws the teeth of the first and second jaws 276, 290 into engagement to thereby fix the first and second jaws 276, 290 into a fixed position relative to each other and to thereby fix members 216, 224 into a fixed position relative to each other.

In their fixed position, members 216, 224 may define a right angle, an acute angle, or an obtuse angle.

Corner post lock 270 further includes corner post 268 itself and lower portions. These lower portions include, as shown in FIG. 13A, a first receptor 294, a first jaw or foot 296, a second receptor 298 and a second jaw 300. First receptor 294 receives and engages lower member 218. Second receptor 298 receives and engages lower member 228. First jaw 296 is integral and one-piece with first receptor 294. Second jaw 300 is integral and one-piece with second receptor 298. The upper face of second jaw 300 has a central depression formed therein for receiving the lower end of corner post 268. When corner post 268 is urged in the downward direction by operation of knob 284, the lower end of the corner post 268 brings pressure to bear upon the second jaw 300, which in turn brings pressure to bear upon the first jaw 296 to lock, via a friction fit, first and second jaws 296, 300 to each other.

FIG. 13A shows the cage 105 in an intermediate configuration, between the folded down configuration shown in FIG. 13B and the folded out configuration shown in FIG. 12A. In the intermediate configuration shown in FIG. 13A, interior side portions 302 and 304 are disposed obliquely relative to each other and interior side portions 306, 308 are disposed obliquely relative to each other.

Interior side portion 302 includes upper member 222, lower member 226, and posts 232 therebetween. Interior side portion 302 further includes lock or slide 258. Interior side portion 304 includes upper member 224, lower member 228, and posts 232 therebetween. Interior side portions 302, 304 swing relative to each other via upper and lower hinges 230, where one hinge 230 is engaged to and between upper members 222 and 224, and where one hinge 230 is engaged to and between lower members 226 and 228. Interior side portion 302 swings relative to cage side 210 via corner post lock or mechanism 270. Interior side portion 304 swings relative to cage side 208 via corner post lock or mechanism 270.

Interior side portion 306 includes upper member 222, lower member 226, and posts 232 therebetween. Interior side portion 306 further includes lock or slide 258. Interior side portion 306 further includes a space between upper member 222 and lower member 226 for receiving a portion of gate 234. Interior side portion 308 includes upper member 224, lower member 228, and posts 232 therebetween. Interior side portion 308 further includes gate 235. Interior side portions 306, 308 swing relative to each other via upper and lower hinges 230, where one hinge 230 is engaged to and between upper members 222 and 224, and where one hinge 230 is engaged to and between lower members 226 and 228. Interior side portion 306 swings relative to cage side 208 via corner post lock or mechanism 270. Interior side portion 308 swings relative to cage side 210 via corner post lock or mechanism 270.

To fold the cage 105 from the folded out configuration shown in FIG. 12A to the folded down configuration shown in FIG. 13B, the corner post locks or mechanisms 270 on interior side portions 306, 308 are turned so as to be loosened. Then gate 234 is disengaged from vertical side portion 306 by drawing the slides 254 toward each other to draw the upper and lower posts 244 out of their respective upper and lower holes 248 and, at the same time, sliding lock 258 out of engagement with upper member 224 of interior side portion 308, whereupon the interior side portions 306, 308 can begin to be drawn inwardly. Then the corner post locks or mechanisms 270 on interior side portions 302, 304 are turned so as to be loosened. Then lock 258 is slid out of engagement with upper member 224 of interior side portion 304, whereupon interior side portions 302, 304 can begin to be drawn inwardly. Then interior side portions 302, 304 are swung to a greater degree and interior side portions 306, 308 are swung to a greater degree to drawn cage sides 208, 210 toward each other to the folded down configuration shown in FIG. 13B.

In the folded down configuration shown in FIG. 13B, interior side portion 302 confronts and lies parallel to interior side portion 304 and cage side 210. Interior side portion 304 confronts and lies parallel to interior side portion 302 and cage side 208. Interior side portion 306 confronts and lies parallel to interior side portion 308 and cage side 210. Interior side portion 308 confronts and lies parallel to interior side portion 306 and cage side 208. Cage sides 208 and 210 lie parallel to each other. Interior side portion 302 is coplanar with interior side portion 306. Interior side portion 304 is coplanar with interior side portion 308. In the folded down configuration shown in FIG. 13B, knobs 284 of corner post locks or mechanisms 270 may be turned to tighten corner post locks or mechanisms 270 to fix cage 105 in the folded down configuration such that the cage 105 does not inadvertently fold out.

FIG. 14A shows the folded down configuration of FIG. 13B in the crate bottom 104. When in the crate bottom 104, the corner post locks 270 fit with friction between the inner faces of the first end 114 and second end 116 of the crate bottom 104. In other words, the distance between outer end portions of the corner post locks 270 of cage side 210 as shown in FIG. 13B (and the distance between outer end portions of the corner post locks 270 of cage side 208 as shown in FIG. 13B) is slightly greater than the distance between opposing portions of the inner faces of the first end 114 of the crate bottom 104 and second end 116 of the crate bottom 104 such that the cage 105 fits with a slight amount of friction into the crate bottom 104. This same relationship is present with the crate top 102. That is, the distance between outer end portions of the corner post locks 270 of cage side 210 as shown in FIG. 13B (and the distance between outer end portions of the corner post locks 270 of cage side 208 as shown in FIG. 13B) is slightly greater than the distance between opposing portions of the inner faces of the first end 114 of crate top 102 and second end 116 of crate top 102 such that the cage 105 fits with a slight amount of friction into the crate top 102.

FIG. 14B shows the cage 105 in the folded out configuration and engaged to each of the crate top 102 and the crate bottom 104. In this configuration, snap 124 (shown in FIGS. 11C and 11D) of the crate top 102 engages the horizontal upper member 216 of the cage 105. In this configuration, boss 168 (shown in FIG. 10B) of the crate bottom 104 engages one of the lower horizontal members, such as one of the lower end horizontal members 226 or 228, of the cage 105. In this configuration, gate 234 may be closed or open. Gate 234 may swing inwardly or outwardly. Gate may remain in the inner open position where the gate 234 is inward of the interior side portions 306, 308. Gate may remain in the outer open position where the gate 234 is outward of the interior side portions 306, 308. The biased extended positions of the foreshortened posts 244 make the posts 244 hit the upper and lower members 222 and 226, prevent the gate 234 from swinging through the closed position and keep the gate 234 from closing automatically, thereby permitting a pet to come and go as he or she pleases with a slight push with the nose.

FIGS. 15A, 15B, 15C, 15D, 15E, and 15F show various configurations that the cage 105 may take when standing alone and disengaged from each of the crate top 102 and crate bottom 104. Cage 105 may be converted from an endless configuration, such as shown in FIGS. 13A, 13B and 14B, to a configuration having ends, examples of which are shown in FIGS. 15A, 15B, 15D, 15E, and 15F. To convert the cage 105 from an endless configuration to a configuration having ends, knob 284 is turned so as to disengage knob 284 and second jaw 290 from the first jaw 276. Then corner post 268 is lifted vertically out of the center collar having the central opening that is formed in first jaw 276. Then receptor 274 and its upper member, such as member 224, is lifted off of first jaw 276 and lower second jaw 300 is lifted off of first jaw or foot 296 whereupon, for example, side 208 is separated from interior side portion 308 of side 212 and whereupon, for example, cage 105 can form any one of the barriers or partitions shown in FIGS. 15A, 15B, 15C, 15E, and 15F. By turning knobs 284 to loosen corner post locks 270, each of the adjacent sides of the cage 105 can swing face to face relative to each other, where adjacent sides are 208/304, 304/302, 302/210, 210/306, 306/308, and 308/208, such that adjacent sides can be positioned almost 360 degrees relative to each other. Interior side portions 302, 304, 306 and 308 can also be referred to as sides as the interior side portions can form an independent and distinct face. In some cases, it may be preferable that the hinge 230 be a one-way hinge such that adjacent interior side portions may swing inwardly toward an inside of the cage but not outwardly beyond the rectilinear relationship shown in FIG. 12A. In some cases, it may be preferable that sides forming junctures at the corner posts 268 swing relative to each other between about zero degrees and about 270 degrees instead of between about zero degrees and about 360 degrees, where the 270 degree stop is formed by stops formed among jaws 296, 300 and receptacles 294, 298 and stops formed among jaws 276, 290 and receptacles 272, 274.

In operation, where the starting point is the cage 105 in the folded down configuration in the pet crate 100, the slides 100 are slid from the locked position shown in FIG. 11B to the unlocked position shown in FIG. 11A to release the crate top 102 from the crate bottom 104. Then the crate top 102 is taken off the crate bottom 104 and set aside. In the folded down configuration, cage 105 may be locked. That is, the corner post locks 270 may be relatively tight such that the cage 105 does not inadvertently fold out from the folded down configuration. Then the knobs 284 are turned to loosen the corner post locks 270 such that the cage side 210 can swing relative to adjacent interior side portion 222 of cage side 214 and to adjacent interior side portion 222 of cage side 212 and such that cage side 208 can swing relative to adjacent interior side portion 224 of cage side 214 and to adjacent interior side portion 224 of cage side 212. Then cage side 105 is folded partially out, such as to the intermediate configuration shown in FIG. 13A where each of cage sides 212, 214 form a V-shape and point toward each other. In this intermediate configuration, cage 105 is placed upright on the floor 126 of the crate bottom 104 such that the open bottom of the cage 105 is closed off More specifically, the feet or first jaws 296 are placed on the upper portion 150 of the floor 126. Then the cage 105 is further folded out by drawing out the lower members 226, 228 of each of the cage sides 212, 214. As the lower members 226, 228 are drawn out, each of the lower members 226, 228 is engaged by one of the bosses 168. As the lower members 226, 228 are drawn out, lock or slide 258 of each of the cage sides 212, 214 is slid out of the way and then released so as to lock each of the cage sides 212, 214 in a planar configuration (where the interior side portions 306 and 308 are coplanar and where the interior side portions 302 and 304 are coplanar). Then the knobs 284 are turned to tighten the corner post locks 270 such that the cage 105 is relatively rigidly fixed in the four sided folded out configuration. At this point in time, the gate 234 is open and is disposed in the interior of the cage 105. The gate 234, if desired, may be closed. Then the crate top 102 is lifted up and placed on the open top of the cage 105 such that the open top of the cage 105 is closed off. As the crate top 102 is set on the cage 105, the snaps 124 may automatically lock the cage 105 to the crate top 102. Such a snapping action may be aided by inserting a finger or thumb into the finger hole 206 and sliding or drawing the snap 124 inwardly and then releasing the snap 124 which automatically returns to the locked position. At this point in time, the pet crate 100 is one-piece and can be carried from place to place or can be wheeled from place to place as a whole, with the cage 105 in the folded out configuration and sandwiched and engaged to each of the crate top 102 and the crate bottom 104.

In the configuration where the cage 105 is sandwiched between the crate top 102 and the crate bottom 104, a pet may be housed in the pet crate 100. Gate 234 may be closed. Gate 234 may be left open, swinging to the inside of the cage 105. It should be noted that endless sidewall 108 of the crate top 102 and endless sidewall 128 of the crate bottom 104 bar the foreshortened posts 244, 246 from swinging out. In such a configuration, cage 105 has a closed top (the crate top 102) and a closed bottom (the crate bottom 104). The pet is protected from rain and the sun. The pet is also protected from wet grounds such as wet grass, and from other elements such as gravel or sand. Blankets and pet cushions are also protected from wet grass, gravel and sand.

In the configuration where the crate top 102 is removed and where the cage 105 is engaged to the crate bottom 104, the pet may be accessible from the open top or the pet may enjoy the full benefit of the sun while the lawn may be protected from a puppy that loves to dig.

In the configuration where the crate bottom 104 is removed and where the cage 105 is engaged to the crate top 102, a pet may be protected from the rain and the sun, but enjoy the benefits of the cool summer grass.

In the configuration where each of the crate top 102 and crate bottom 104 is removed so as to leave cage 105 as a stand alone cage with an open top and an open bottom, the pet may enjoy the full benefit of the sun and the cool summer grass at the same time.

To disassemble the pet crate 100 from the assembled position where the cage 105 is sandwiched between the crate top 102 and the crate bottom 104, the crate top 102 is taken off by inserting a finger or thumb into the finger hole 206 and sliding or drawing the snap 124 inwardly to disengage the snap 124 from its respective extension 202. After the four snaps 124 are disengaged, the crate top 102 can be lifted off the cage 105. Then the knobs 284 are turned so as to loosen the corner post locks 270. Then gate 234 is open and swung to the inside of the cage 105. Then the lock or slide 258 of each of the cage sides 212, 214 is slid to an out of the way or unlocked position such that interior side portions 306 and 308 may swing relative to each other to point inwardly and such that interior side portions 302 and 304 may swing relative to each other to point inwardly, whereby the intermediate configuration of FIG. 13A is formed. As the intermediate configuration is being formed, lower members 226, 228 become disengaged from their respective bosses 168. Then the cage 105 can be lifted out of the crate bottom 104 or can be further folded while disposed in the crate bottom 104 to the folded down configuration shown in FIG. 13B.

Then the knobs 284 can be turned so as to tighten the corner post locks 270 to keep the cage 105 in the folded down configuration. Then the folded down cage 105 is turned on its side and placed in the crate bottom 104. Then the crate top 102 is placed over the crate bottom 104 having the cage 105 therein, whereupon the slides 100 are slid from the unlocked position shown in FIG. 11A to the locked position shown in FIG. 11B. With the pet crate 100 having formed a clamshell like or suitcase like package, the pet crate 100 can be picked up by the handle 118 and wheeled to a desired location.

When in the packed and folded down configuration shown in FIG. 7, pet crate 100 has a first height. When in the operating and folded out configuration shown in FIG. 14B, the pet crate 100 has a second height. Preferably the first height is between about 10% and about 50% of the second height, more preferably between about 10% and about 40% of the second height, and most preferably between about 10% and about 30% of the second height.

As to corner post lock 270, including receptors 272, 274, first and second upper jaws 276, 290, corner posts 268, knob 284, receptors 294, 298, first and second lower jaws 296, 300, the Flannery U.S. Patent Application Publication 2008/0185566 A1 published Aug. 7, 2008 and entitled In-House Gated Safety Barrier Having Customizable Layout is hereby incorporated by reference in its entirety.

Figure 16A:
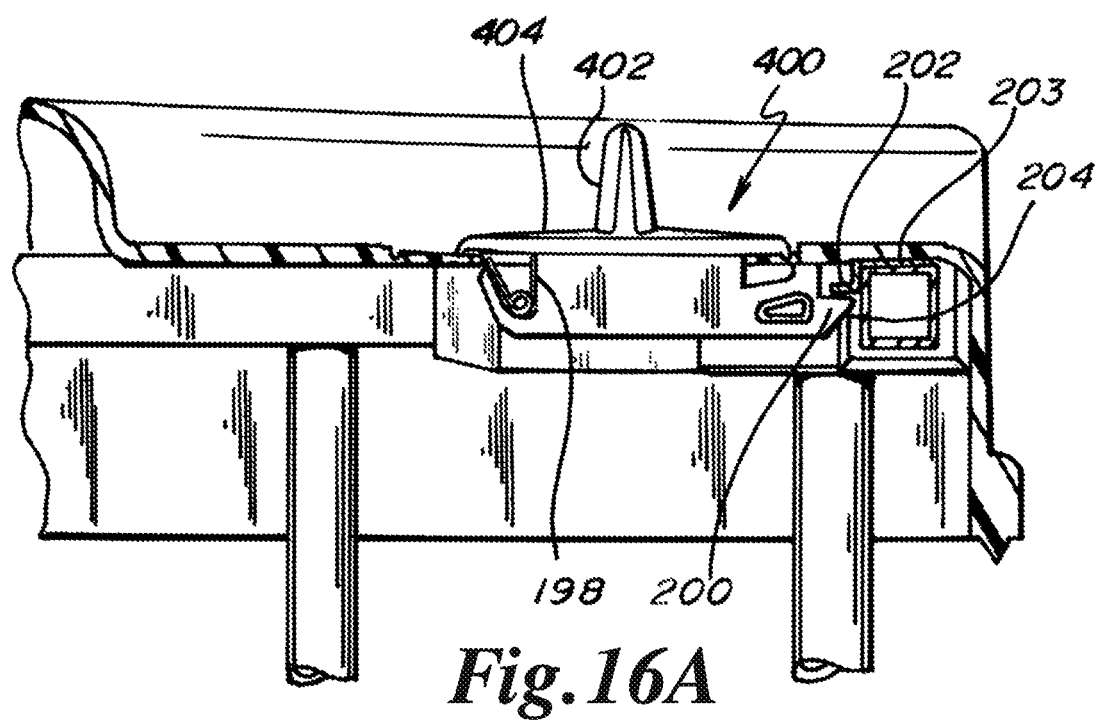
FIG. 16A is a partially section side view of an alternate embodiment of the snap or slide of FIG. 11D.
Figure 16B:
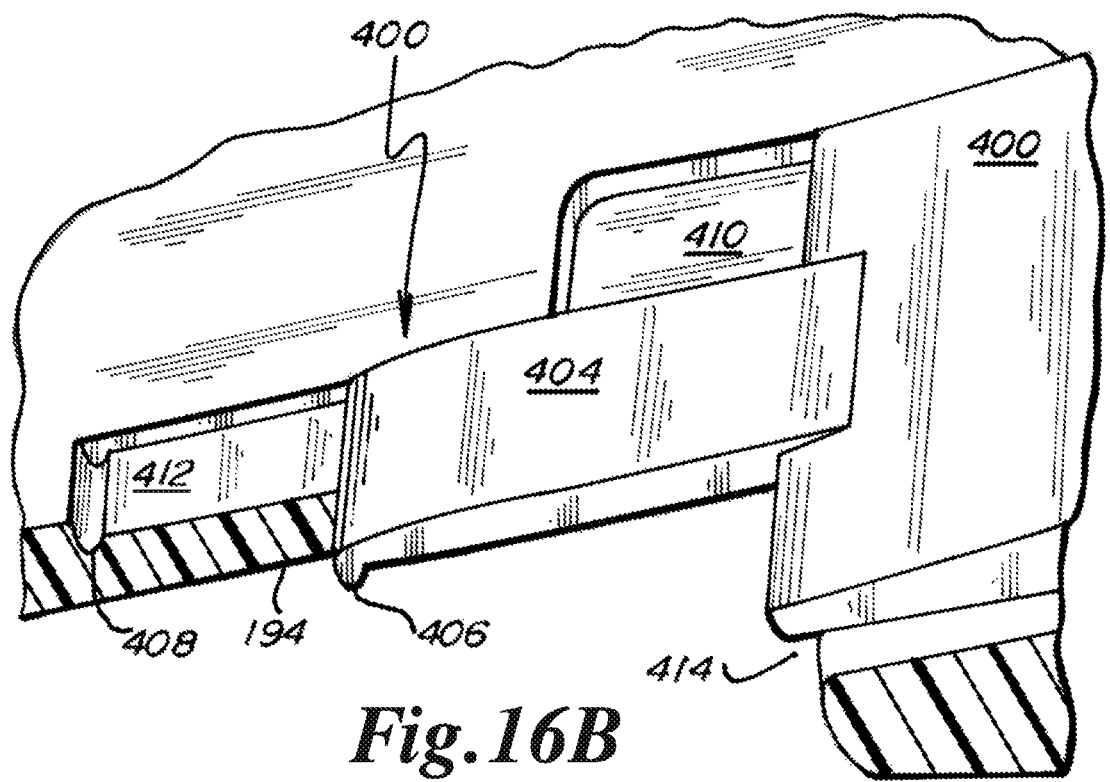
FIG. 16B is a partially section perspective view of the snap or slide of FIG. 16A.

FIGS. 16A and 16B show an alternate snap or slide 400 that can replace the snap or slide 124, which is structured to slide back to a closed and locked position (where ledge 200 engages extension 203) automatically under bias from torsion spring 198 unless held open manually. Snap or slide 400 has a finger tab 402 and a positive locking tab 404. Locking tab 404 operates to keep snap or slide 400 in an open and locked position (where detent 406 engages detent well 408) such that snap or slide 400 may be slid to and between an open and locked position (where detent 406 engages detent well 408) and a closed and locked position (where ledge 200 engages extension 203).

More particularly, snap or slide 400 includes the finger tab 402, whereas snap or slide 124 includes a finger well or hole 206. Tab 402 is integral and one-piece with snap or slide 400. Snap or slide 400, like snap 124, is set in opening 192 in cavity 122. Snap 400 rides or slides on side edges of the opening 192 from rear edge portion 194 to front edge portion 196. Torsion or coil spring 198 set in the body of the snap 400 biases the snap 400 toward the front edge portion 196 via a prong of the coil spring 198 being set against a portion of the edge of the opening 192 of the cavity 122 of the crate top 102. Snap 400 further includes the ledge 200 for receiving the extension 202 of the metal piece 203 engaged to the horizontal upper member 216 of the cage 105. Snap 400 further includes the angled surface 204 that leads into the ledge 200. In combination, ledge 200 and angled surface 204 form an acute angle. When the crate top 102 is placed on top of the cage 105, extension 202 hits the angled surface 204, which in turn urges the snap 400 inwardly toward the rear edge portion 196 until the extension 202 clears the angled surface 204, whereupon with resistance being cleared the snap 400 snaps forwardly toward the front edge portion 196 and the ledge 200 comes to rest under the extension 202, which secures the crate top 102 to the cage 105. To release the crate top 102 from the cage 105, the snap 400 includes a finger tab 402, instead of the finger hole 206, against which a finger may be pressed to draw the snap 400 toward the rear edge portion 194, thereby drawing the ledge 200 inwardly until the ledge 200 clears the extension 202 whereupon the crate top 102 can be lifted off the cage 105.

Snap 400 further includes a positive locking tab 404 extending from the main body of snap 400. Positive locking tab 404 extends from one end of the main body. Ledge 200 extends from the opposite end of the main body. At the distal end of the positive locking tab 404, a locking tab detent 406 is formed. Detent 406, under positive plastic pressure from tab 404, engages a locking tab detent receiving well 408 that is formed in rear edge portion 194 adjacent to opening 192 of crate top 102. It should be noted that the each of the side edges of opening 192 of crate top 102 includes a track 410 for receiving a portion of the main body of the snap 400. In communication with track 410 is a track 412 for receiving the positive locking tab 404. Track 412 is not formed on side edges of opening 192 but extends away from the opening 192. Track 412 is set at a first depth and extends laterally. Locking tab detent receiving well 408 is set at a greater depth, extends longitudinally, and is formed in a distal end of track 412. Snap 400 includes laterally extending grooves or channels 414 formed therein for receiving respective opposing side edges of opening 192 such that snap 400 receives therein portions of sides edges that make up opening 192. The positive locking tab 404 utilizes the spring or resiliency of the plastic material from which it is formed to overcome the biasing force of the torsion spring 198 to keep detent 406 in detent well 408 to hold the snap or latch 400 in an open position and in a locked position. An open position of snap or slide 400 is when ledge 200 is clear of extension 202 whereupon the crate top can be lifted off the cage 105. An open and locked position of snap or slide 400 is when detent 406 is engaged in detent well 408. A closed and locked position of snap or slide 400 is when ledge 200 engages extension 202.

In operation of the embodiment of FIGS. 16A and 16B, where the crate top 102 is engaged to cage 105, the finger tab 402 is utilized to push the snap or slide 400 inwardly from the closed and locked position where the ledge 200 engages the extension 202 to the open and locked position where the detent 406 engages the detent well 408. In this position, the biased snap or slide 400 does not slide back to the closed and locked position. The holding force of the positive locking tab 404 is greater than the biasing force of the torsion spring 198. Thus the user may walk around the crate top 102 and slide all of the snaps or slides 400 to the open and locked position without fear that the snaps or slides 400 will slide back to the closed and locked position. The finger tab 402 can also be utilized in the opposite direction, i.e., to slide the snap or slide 400 from the open and locked position where the detent 406 engages the detent well 408 to the closed and locked position where ledge 200 engages extension 202.

Finger tab 402 can be utilized to push the snap or slide 400 outwardly so as to disengage the detent 406 from the detent well 408, whereupon the user can release his or her finger from the tab 402, whereupon the snap or slide 400 can return under the bias of the torsion spring 198 to the closed and locked position where the ledge 200 engages the extension 202. Or the user can keep pressure upon the finger tab 402 from the time the detent 406 disengages from the detent well 408 to the time the ledge 200 engages with the extension 202.

From the closed and locked position of snap or slide 400, ledge 200 has a certain first distance to slide inwardly until it is disengaged from extension 202. From the closed and locked position of snap or slide 400, positive locking tab 404 has a certain second distance to slide inwardly until it engages detent well 408. The first distance here is less than the second distance such that a user may slide the snap or slide 400 to disengage the crate top 102 from the cage 105 but, at the same time, not engage the positive locking tab 404 to the detent well 408.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An open upper end and open lower end cage apparatus, comprising:
   a) a cage, with the cage having a folded down configuration and a folded out configuration;
   b) wherein the cage is endless in the folded down configuration and wherein the cage is endless in the folded out configuration;
   c) wherein the cage includes folding sides and nonfolding sides in the folded out configuration, with the folding sides opposing each other in the folded out configuration, and with the nonfolding sides opposing each other in the folded out configuration;
   d) wherein each of the sides is swingable relative to an adjacent side to fold the cage between the folded down configuration and the folded out configurations; and
   e) wherein the cage includes an open upper end and an open lower end when the cage is in the folded out configuration, with the open upper end being opposite the open lower end when the cage is in the folded out configuration such that the cage forms a vertical through opening extending through the open upper end and the open lower end.

2. The open upper end and open lower end cage apparatus of claim 1, wherein the cage includes opposing sides, wherein the opposing sides of the cage are spaced apart when the cage is in the folded out configuration, and wherein the opposing sides of the cage confront each other when the cage is in the folded down configuration.

3. The open upper end and open lower end cage apparatus of claim 1, wherein the cage in the folded down configuration includes six sides, and with adjacent sides in the folded down configuration being generally disposed at acute angles to each other.

4. The open upper end and open lower end cage apparatus of claim 1, wherein the cage in the folded out configuration includes four sides, wherein adjacent sides of said four sides of the cage in the folded out configuration are generally disposed at right angles to each other, and wherein opposing sides of said four sides of the cage in the folded out configuration are generally disposed parallel to each other.

5. The open upper end and open lower end cage apparatus of claim 1, wherein the cage in the folded out configuration includes four sides, and with at least one of said four sides of the cage having interior portions that are swingable relative to each other.

6. The open upper end and open lower end cage apparatus of claim 1, wherein the cage in the folded out configuration includes four sides, wherein at least one side of said four sides of the cage includes interior side portions, where said interior side portions lie generally in a plane in the folded out configuration, and where said interior side portions in the folded down configuration confront each other.

7. The open upper end and open lower end cage apparatus of claim 1, wherein the cage includes two ends, with said two ends being engagable and disengagable from each other such that said cage can form an endless cage when the ends are engaged to each other and such that the cage can form a fence when the ends are disengaged from each other.

8. The open upper end and open lower end cage apparatus of claim 7, wherein one fence that the cage can form is a straight fence.

9. The open upper end and open lower end cage apparatus of claim 7, wherein one fence that the cage can form is a zig-zag fence.

10. The open upper end and open lower end cage apparatus of claim 7, wherein one fence that the cage can form is a self-standing fence.

11. The open upper end and open lower end cage apparatus of claim 1, wherein the cage includes four sides, and wherein at least one side of said four sides of the cage lies generally in a plane in each of the folded out configuration and folded down configuration.

12. The open upper end and open lower end cage apparatus of claim 1, wherein the cage includes sides in the folded out configuration, wherein each of the sides in the folded out configuration includes a horizontally extending upper member, a horizontally extending lower member, and a set of vertically extending post members, with the horizontally extending upper member and horizontally extending lower member being structurally set apart and structurally tied together by the set of vertically extending post members in the folded out configuration, with the horizontally extending upper member confronting a top when the cage is in the folded out configuration, and with the horizontally extending lower member confronting a bottom when the cage is in the folded out configuration.

* * * * *